United States Patent
Itoh et al.

(10) Patent No.: US 6,959,540 B2
(45) Date of Patent: Nov. 1, 2005

(54) EXHAUST GAS PURIFICATION DEVICE OF INTERNAL COMBUSTION ENGINE

(75) Inventors: Kazuhiro Itoh, Mishima (JP); Toshiaki Tanaka, Numazu (JP); Eiji Iwasaki, Susono (JP); Shinya Hirota, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/943,946

(22) Filed: Sep. 20, 2004

(65) Prior Publication Data

US 2005/0034450 A1 Feb. 17, 2005

Related U.S. Application Data

(63) Continuation of application No. 09/720,489, filed as application No. PCT/JP99/03349 on Jun. 23, 1999, now abandoned.

(30) Foreign Application Priority Data

Jun. 23, 1998 (JP) .......................................... 10-175637

(51) Int. Cl.$^7$ ................................................ F01N 3/00
(52) U.S. Cl. ........................... 60/286; 60/295; 60/301; 60/303
(58) Field of Search .......................... 60/274, 284, 286, 60/295, 301, 303; 422/148, 149, 188

(56) References Cited

U.S. PATENT DOCUMENTS

| | | | |
|---|---|---|---|
| 3,072,457 A | 1/1963 | Bloch | 60/296 |
| 5,272,871 A | 12/1993 | Oshima et al. | 60/286 |
| 5,369,956 A | 12/1994 | Daudel et al. | 60/286 |
| 5,522,218 A * | 6/1996 | Lane et al. | 60/274 |
| 5,531,068 A | 7/1996 | Kass et al. | 60/296 |
| 5,628,186 A | 5/1997 | Schmelz | 60/274 |
| 5,643,536 A | 7/1997 | Schmelz | 60/299 |
| 5,746,052 A | 5/1998 | Kinugasa et al. | 60/274 |
| 5,833,932 A | 11/1998 | Schmelz | 60/301 |
| 5,845,487 A | 12/1998 | Fraenkle et al. | 60/286 |
| 5,884,476 A | 3/1999 | Hirota et al. | 60/278 |
| 5,918,555 A | 7/1999 | Winegar | 422/171 |
| 5,924,280 A | 7/1999 | Tarabulski | 60/278 |
| 5,992,141 A | 11/1999 | Berriman et al. | 60/286 |
| 6,125,629 A * | 10/2000 | Patchett | 60/286 |
| 6,415,602 B1 * | 7/2002 | Patchett et al. | 60/286 |
| 6,427,439 B1 * | 8/2002 | Xu et al. | 60/286 |
| 6,449,945 B1 * | 9/2002 | van Nieuwstadt | 60/286 |
| 6,546,720 B2 * | 4/2003 | van Nieuwstadt | 60/286 |
| 6,698,191 B2 * | 3/2004 | Xu et al. | 60/286 |
| 6,713,030 B1 * | 3/2004 | Chandler et al. | 423/239.1 |
| 6,742,326 B2 * | 6/2004 | Xu et al. | 60/284 |
| 6,755,014 B2 * | 6/2004 | Kawai et al. | 60/286 |

FOREIGN PATENT DOCUMENTS

| | | |
|---|---|---|
| DE | 43 15 278 A1 | 12/1992 |
| EP | 0 515 857 A1 | 12/1992 |
| EP | 0 617 199 A1 | 9/1994 |
| JP | 63-57810 | 3/1988 |
| JP | 3-213614 | 9/1991 |

(Continued)

*Primary Examiner*—Tu M. Nguyen
(74) *Attorney, Agent, or Firm*—Kenyon & Kenyon

(57) ABSTRACT

A catalyst (22) suitable for reduction of the $NO_x$ in an exhaust gas by ammonia in the presence of excess oxygen is arranged in the exhaust passage (18, 21) of an internal combustion engine. An aqueous urea solution is fed through a flow control valve (33) to the inside of the exhaust passage (21) upstream of the catalyst (22). When the temperature of the catalyst (22) is low, a large amount of the aqueous urea solution is fed to make the urea contained in the aqueous urea solution be stored in the catalyst (22). When the engine is accelerated and the temperature of the catalyst (22) rises, ammonia is released at a little at a time from the inside of the catalyst (22) and the $NO_x$ in the exhaust gas is reduced by the released ammonia.

21 Claims, 20 Drawing Sheets

FOREIGN PATENT DOCUMENTS

| | | |
|---|---|---|
| JP | 3-129712 | 12/1991 |
| JP | 4-11248 | 2/1992 |
| JP | 4-215821 | 8/1992 |
| JP | 5-285343 | 11/1993 |
| JP | 5-296029 | 11/1993 |
| JP | 5-317725 | 12/1993 |
| JP | 6-257487 | 9/1994 |
| JP | 6-294318 | 10/1994 |
| JP | 6-343877 | 12/1994 |
| JP | 7-12660 | 3/1995 |
| JP | 7-57303 | 6/1995 |
| JP | 7-232035 | 9/1995 |
| JP | 8-121154 | 5/1996 |
| JP | 9-173782 | 7/1997 |
| JP | 2722990 | 11/1997 |
| WO | WO 96 04980 A | 2/1996 |
| WO | WO 99 55446 A | 11/1999 |

* cited by examiner

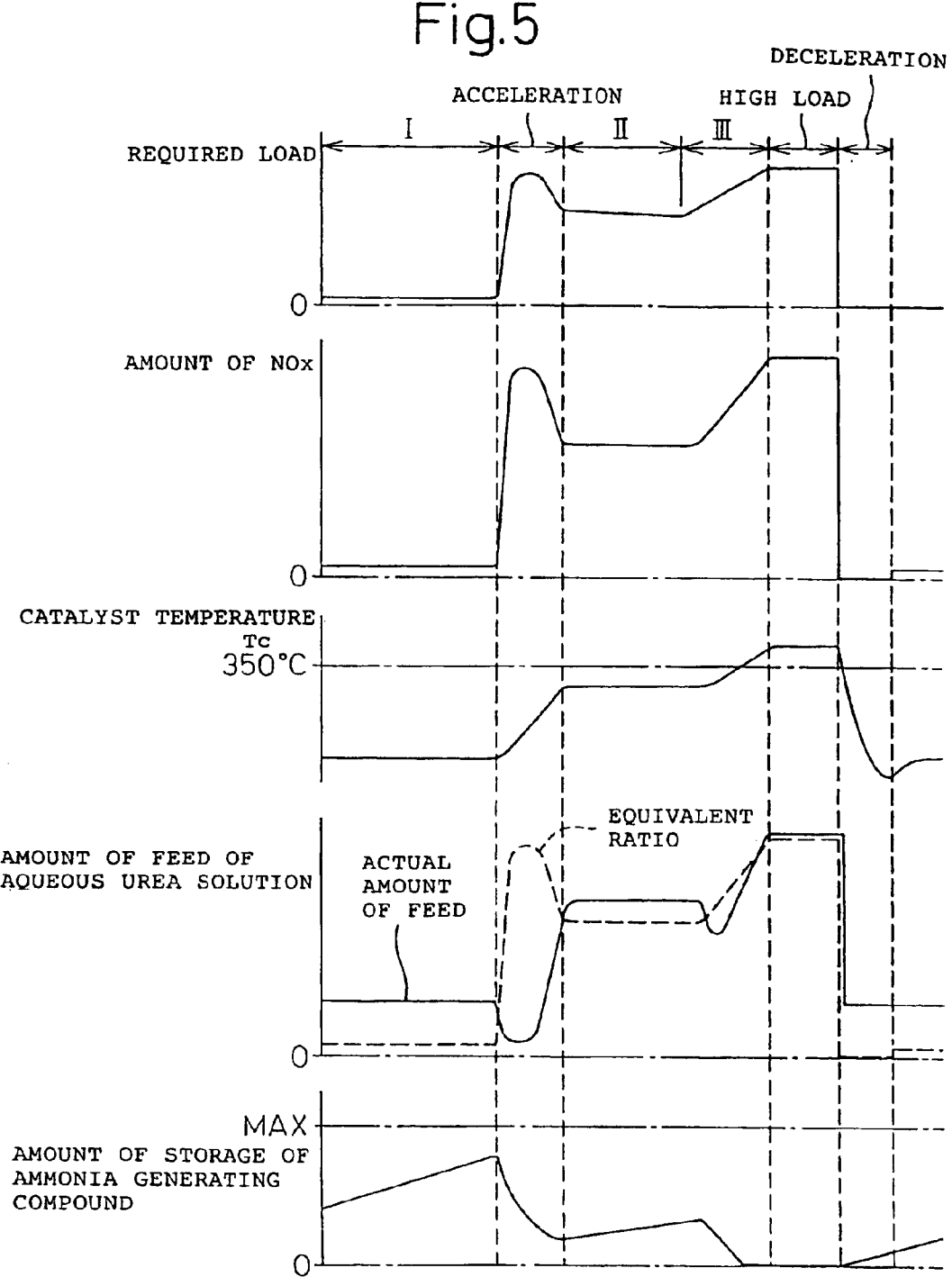

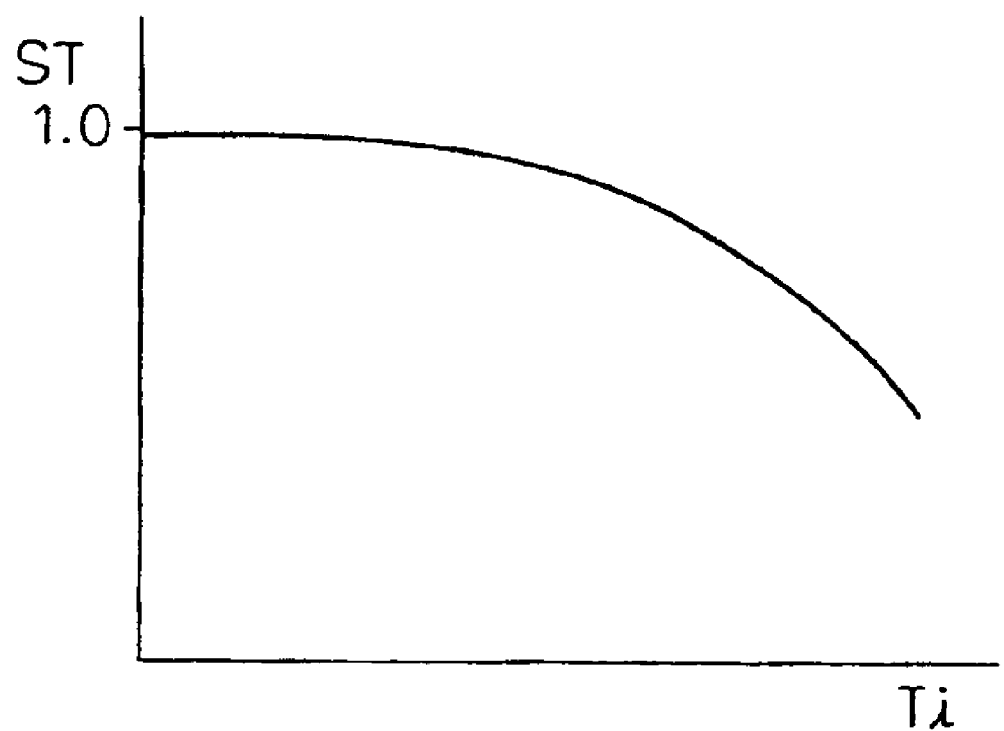

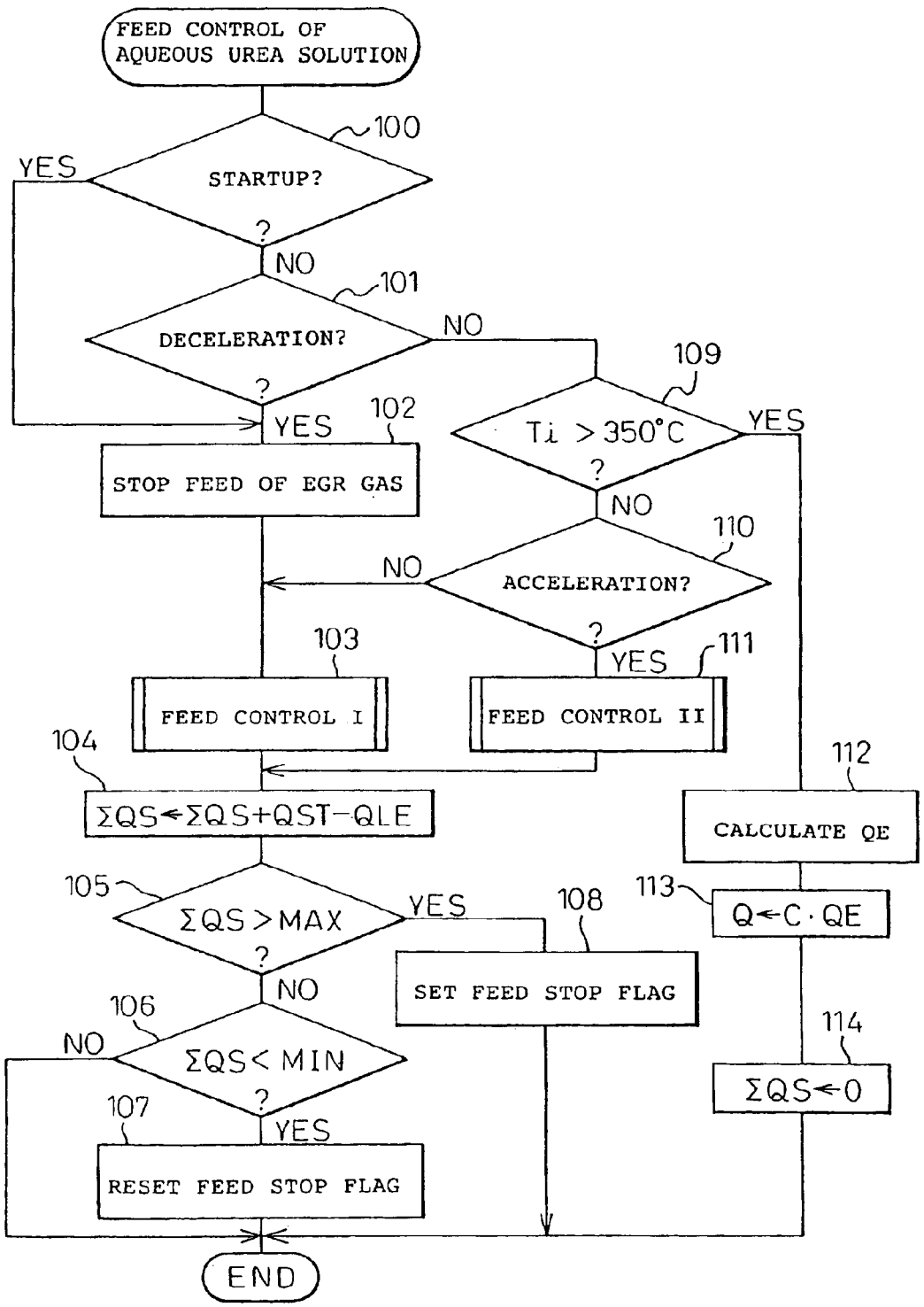

EXHAUST GAS →

EXHAUST GAS PURIFICATION DEVICE OF INTERNAL COMBUSTION ENGINE

This is a continuation of application Ser. No. 09/720,489 filed 22 Dec. 2000, now abandoned, which is a 371 of PCT/JP99/03349, filed Jun. 23, 1999, which claims priority to Japanese Patent Application No. 10-175637 filed 23 Jun. 1998, the contents of which are incorporated herein by reference in their entirety.

TECHNICAL FIELD

The present invention relates to an exhaust gas purification device of an internal combustion engine.

BACKGROUND ART

It is possible to place a catalyst suitable for the reduction of $NO_x$ in an exhaust gas by ammonia and to feed an aqueous urea solution into the engine exhaust passage upstream of the catalyst to cause reduction of the $NO_x$ in exhaust gas by the ammonia generated from the aqueous urea solution. In this case, however, the purification rate of the $NO_x$ becomes lower along with a fall in the temperature of the catalyst. Therefore, known in the art has been an internal combustion engine designed to calculate the equivalent ratio of the urea necessary for reducing $NO_x$ by an $NO_x$ purification rate in accordance with the catalyst temperature and to control the amount of feed of the aqueous urea solution so that urea is fed by that equivalent ratio (see Japanese Unexamined Utility Model Publication (Kokai) No. 3-129712).

So long as feeding urea by an equivalent ratio calculated in this way, however, when the catalyst temperature is not that high, the $NO_x$ purification rate is low. Therefore, when the catalyst temperature is not that high, there is the problem that a high $NO_x$ purification rate cannot be obtained. In particular, when the catalyst temperature does not become that high and the amount of $NO_x$ in the exhaust gas is large, such as when the engine is accelerating from a low load operating state, if the $NO_x$ purification rate is low, the problem will arise of a large amount of $NO_x$ being released into the atmosphere.

DISCLOSURE OF THE INVENTION

An object of the present invention is to provide an exhaust gas purification device of an internal combustion engine enabling the $NO_x$ purification rate to be made higher.

According to the present invention, there is provided an exhaust gas purification device of an internal combustion engine arranging a catalyst suitable for reduction of $NO_x$ in exhaust gas by ammonia in the presence of excess oxygen in an engine exhaust passage, the device comprising feeding means for feeding a liquid containing an ammonia generating compound to the catalyst and feed control means for controlling the amount of feed of the liquid, the catalyst storing inside it at least part of the ammonia generating compound contained in the liquid fed to the catalyst and having the function of causing the release of ammonia a little at a time from the ammonia generating compound stored in the catalyst along with the rise of temperature of the catalyst and reducing the $NO_x$ in the exhaust gas by the ammonia released, the device further comprising decision means for deciding if the temperature of the catalyst is in an ammonia generating compound storage region which stores the ammonia generating compound contained in the liquid fed to the catalyst inside the catalyst and does not release almost any ammonia from the stored ammonia generating compound or is in an ammonia release region which causes the ammonia to be released a little at a time from the stored ammonia generating compound, the feed control means feeding a sufficient amount of the liquid to the catalyst when the temperature of the catalyst is in the ammonia generating compound storage region, said sufficient amount of the liquid being necessary to store in the catalyst in advance enough of the ammonia generating compound for releasing the amount of ammonia required when the temperature of the catalyst becomes the ammonia release region.

BRIEF DESCRIPTION OF THE DRAWINGS

FIG. 5 is a time chart of the $NO_x$ reduction processing, FIG. 7 is a view of the ratio of storage of urea, FIG. 10 to FIG. 12 are flow charts of the control of the feed of the aqueous urea solution.

BEST MODE FOR WORKING THE INVENTION

Figure 1:
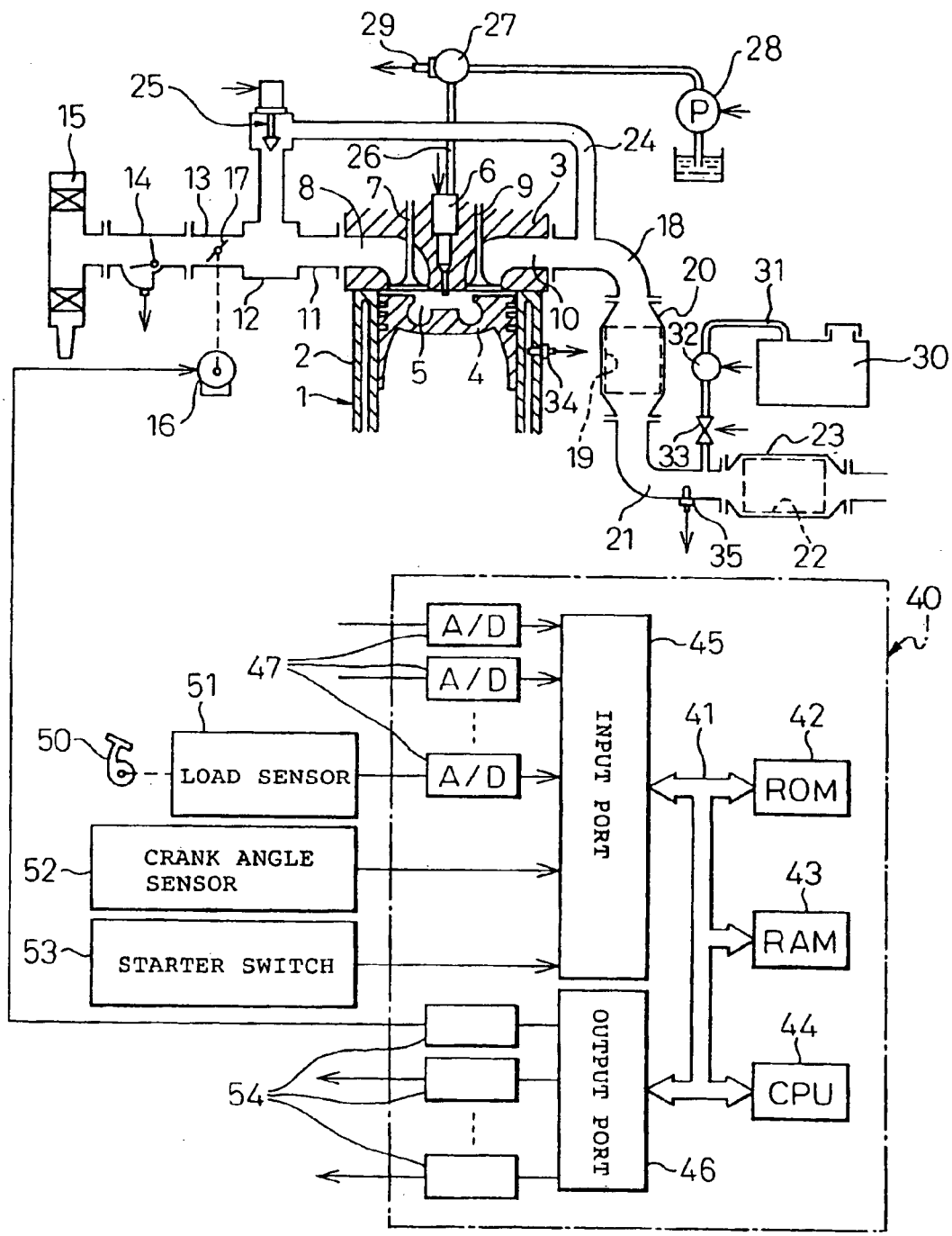
FIG. 1 is an overview of an internal combustion engine.

FIG. 1 shows the case of application of the present invention to a compression ignition type internal combustion engine. Note that the present invention can also be applied to a gasoline engine.

Referring to FIG. 1, 1 indicates an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected to a surge tank 12 through a corresponding intake pipe 11, while the surge tank 12 is connected to an air cleaner 15 through an intake duct 13 and an air flow meter 14. Inside the intake duct 13 is arranged a throttle valve 17 driven by a step motor 16.

On the other hand, an exhaust port 10 is connected to an inlet of a first catalytic converter 20 housing a catalyst 19 through an exhaust manifold 18. The outlet of the first catalytic converter 20 is connected to a second catalytic converter 23 housing a catalyst 22 through an exhaust pipe 21. In the embodiment shown in FIG. 1, the catalyst 19 is comprised of a catalyst having an oxidation function, for example, an oxidation catalyst or a three-way catalyst, while the catalyst 22 is comprised of an $NO_x$ selective reduction catalyst suitable for reduction of $NO_x$ in exhaust gas by ammonia in the presence of an excess of oxygen.

The exhaust manifold 18 and the surge tank 12 are connected to each other through an exhaust gas recirculation (hereinafter referred to as EGR) passage 24. Inside the EGR passage 24 is arranged an electrically controlled EGR control valve 25. The fuel injectors 6 are connected to a fuel reservoir, a so-called common rail 27, through fuel feed pipes 26. Fuel is fed into the common rail 27 from an electrically controlled variable discharge fuel pump 28. The fuel fed into the common rail 27 is fed to the fuel injectors 6 through the fuel feed pipes 26. The common rail 29 has a fuel pressure sensor 29 attached to it for detecting the fuel pressure in the common rail 27. The discharge of the fuel pump 28 is controlled based on the output signal of the fuel pressure sensor 29 so that the fuel pressure in the common rail 27 becomes a target fuel pressure.

On the other hand, a liquid containing an ammonia generating compound for generating ammonia is stored in a tank 30. The liquid containing the ammonia generating compound stored in the tank 30 is fed into the exhaust pipe 21 through a feed conduit 31, a feed pump 32, and an electromagnetically controlled flow control valve 33.

An electronic control unit 40 is comprised of a digital computer provided with a ROM (read only memory) 42, RAM (random access memory) 43, CPU (microprocessor) 44, input port 45, and output port 46 connected to each other through a bidirectional bus 41. The air flow meter 14 generates an output voltage proportional to the amount of intake air. This output voltage is input through a corresponding AD converter 47 to the input port 45. Further, the output signal of the fuel pressure sensor 29 is input through a corresponding AD converter 47 to the input port 45. On the other hand, the engine body 1 has attached to it a water temperature sensor 34 for detecting the engine coolant water temperature, while the exhaust pipe 21 has arranged in it a temperature sensor 35 for detecting the temperature of the exhaust gas flowing through the exhaust pipe 21. The output signals of these water temperature sensor 34 and temperature sensor 35 are input to the input port 45 through the corresponding AD converters 47.

An accelerator pedal 50 has connected to it a load sensor 51 generating an output voltage proportional to the amount of depression L of the accelerator pedal 50. The output voltage of the load sensor 51 is input to the input port 45 through the corresponding AD converter 47. Further, the input port 45 has connected to it a crank angle sensor 52 generating an output pulse each time a crankshaft rotates by for example 30 degrees. Further, an actuation signal of a starter switch 53 is input to the input port 45. On the other hand, the output port 46 is connected through corresponding drive circuits 54 to the fuel injectors 6, the step motor 16, the EGR control valve 25, the fuel pump 28, the pump 32, and the flow control valve 33.

Further, as explained above, a liquid containing an ammonia generating compound is fed into the exhaust pipe 21 upstream of the catalyst 22. Regarding the ammonia generating compounds able to generate ammonia, there are various such compounds. Therefore, it is possible to use various compounds as the ammonia generating compound. In this embodiment of the present invention, urea is used as the ammonia generating compound, while an aqueous urea solution is used as the liquid containing an ammonia generating compound. Therefore, below, the present invention will be explained taking as an example the case of feeding an aqueous urea solution into the exhaust pipe 21 upstream of the catalyst 22.

On the other hand, as explained above, the catalyst 22 is comprised of an $NO_x$ selective reduction catalyst. In the embodiment shown in FIG. 1, titania is used as the carrier of this $NO_x$ selective reduction catalyst. A catalyst $V_2O_5/TiO_2$ comprising vanadium oxide carried on this carrier (hereinafter referred to as a vanadium titania catalyst) or a catalyst Cu/ZSM 5 comprising zeolite as a carrier and copper carried on this carrier (hereinafter referred to as a copper zeolite catalyst) is used.

When the aqueous urea solution is fed into exhaust gas containing an excess of oxygen, the NO contained in the exhaust gas is reduced by the ammonia $NH_3$ generated from the urea $CO(NH_2)_2$ on the catalyst 22 (for example, $2NH_3+2NO+\frac{1}{2}O_2 \rightarrow 2N_2+3H_2O$). In this case, a certain amount of urea is required to reduce the $NO_x$ contained in the exhaust gas and completely remove the $NO_x$ in the exhaust gas. Below, the amount of urea required for reducing and completely removing the $NO_x$ in the exhaust gas will be called the equivalent ratio of urea.

Figure 2:
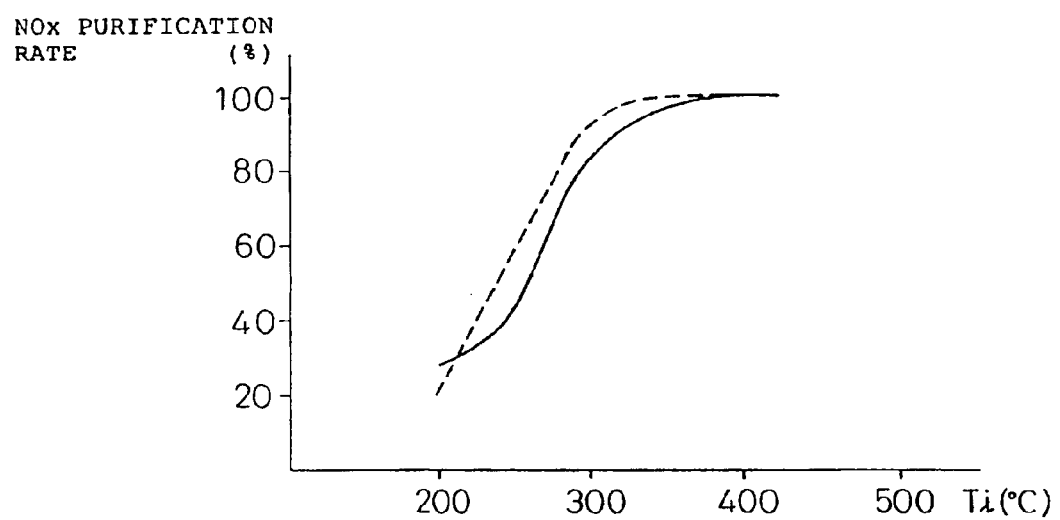
FIG. 2 is a view of the $NO_x$ purification rate.

FIG. 2 shows the $NO_x$ purification rate in the case of feeding an aqueous urea solution so that the amount of urea becomes the equivalent ratio for the amount of $NO_x$ in the exhaust gas when changing the temperature Ti of the exhaust gas flowing into the catalyst 22 while maintaining a constant engine speed. Note that the solid line in FIG. 2 shows the case of use of a copper zeolite catalyst as the catalyst 22, while the broken line shows the case of use of a vanadium titania catalyst as the catalyst 22.

From FIG. 2, it is understood that when aqueous urea solution is fed so that the amount of urea becomes the equivalent ratio with respect to the amount of $NO_x$ in the exhaust gas, for all catalysts 22, when the temperature Ti of the exhaust gas flowing into the catalyst 22 becomes about 350° C. or more, the $NO_x$ purification rate becomes about 100 percent and that as the temperature Ti of the exhaust gas flowing into the catalyst 22 falls, the $NO_x$ purification rate falls.

Figure 3:
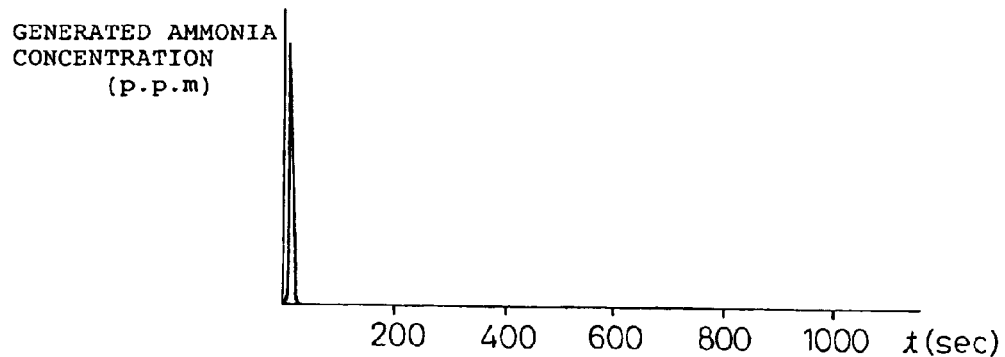
FIG. 3 is a view of the concentration of ammonia generated.

On the other hand, FIG. 3 shows the relation between the elapsed time t (sec) from the feeding of the aqueous urea solution and the concentration of the ammonia generated (ppm) when feeding an aqueous urea solution in the state with the temperature of the catalyst 22 maintained at 400° C. From FIG. 3, it is understood that when feeding the aqueous urea solution, the urea is decomposed into ammonia all at once and ammonia is released all at once. Further, as explained above, when the temperature of the catalyst 22 is 400° C., if the urea is fed by the equivalent ratio, the $NO_x$ purification rate becomes substantially 100 percent.

Therefore, from FIG. 2 and FIG. 3, when the temperature of the catalyst 22 is over about 350° C., if an aqueous urea solution is fed so that the amount of urea becomes the equivalent ratio for the amount of $NO_x$ in the exhaust gas, ammonia is released all at once from the urea contained in the aqueous urea solution and all of the $NO_x$ in the exhaust gas can be reduced by the ammonia. In other words, when the temperature of the catalyst 22 is more than about 350° C., if an aqueous urea solution is fed so that the amount of urea becomes the equivalent ratio for the amount of $NO_x$ in the exhaust gas, it becomes possible to substantially completely purify the $NO_x$ in the exhaust gas.

Figure 4:
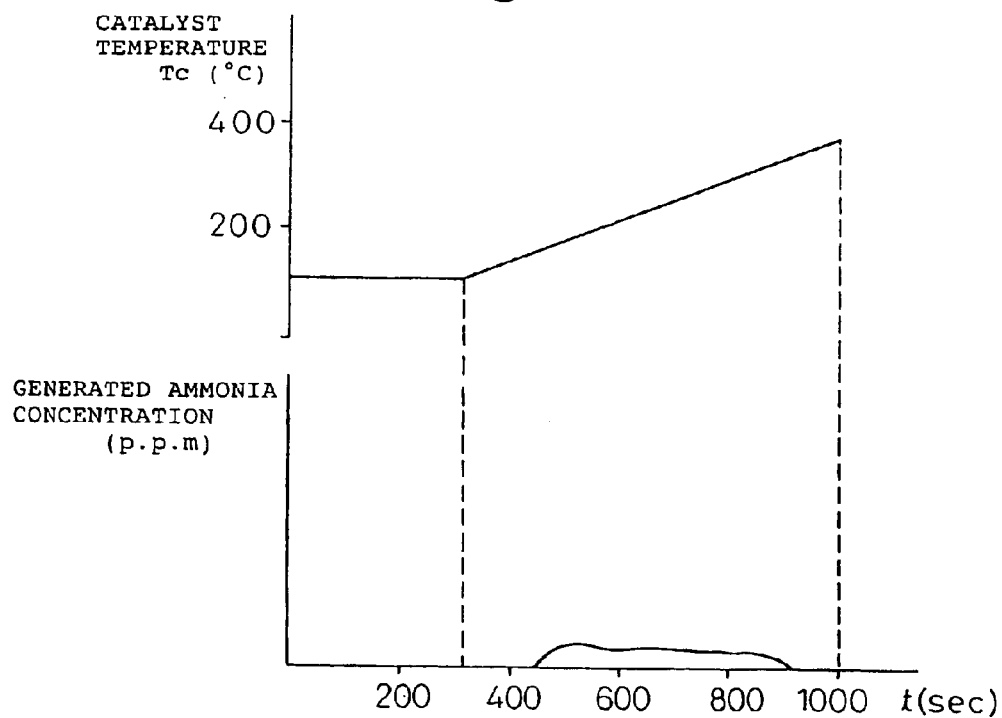
FIG. 4 is a view of the temperature of the catalyst and the concentration of ammonia generated.

On the other hand, FIG. 4 shows the relationship between the elapsed time t (sec) from the start of feeding of the aqueous urea solution and the concentration of the ammonia generated (ppm) when feeding an aqueous urea solution when the temperature Tc of the catalyst 22 is 120° C. and then gradually raising the temperature Tc of the catalyst 22. As shown in FIG. 4, even if the aqueous urea solution is fed, no ammonia at all is generated while the temperature Tc of the catalyst 22 is low. When the temperature Tc of the catalyst 22 starts to rise, ammonia is generated a little at a time as the temperature Tc of the catalyst 22 rises.

FIG. 4 means the following two facts: That is, first, the fact that ammonia is generated when the temperature Tc of the catalyst 22 rises means that the fed urea is stored in the catalyst 22. Second, the temperature of heat decomposition of urea is about 132° C., therefore, considering the fact that ammonia is generated by the heat decomposition of urea, ammonia should be released all at once when the temperature Tc of the catalyst 22 reaches about 132° C. As shown in FIG. 4, however, even if the temperature Tc of the catalyst 22 reaches about 132° C., ammonia is not released all at once. This means that ammonia is not being generated by just the heat decomposition of the urea.

The fact that even if the temperature Tc of the catalyst 22 reaches about 132° C., the ammonia is not released all at once and ammonia is released a little at a time as the temperature Tc of the catalyst 22 rises is believed to be due to the morphological change of the urea on the catalyst 22. That is, urea changes to biuret at about 132° C., biuret changes to cyanuric acid at about 190° C., and cyanuric acid changes to cyanic acid or isocyanic acid at about 360° C. It is believed that ammonia is generated a little at a time in the process of these morphological changes due to the rising temperature. Therefore, as shown in FIG. 4, ammonia is released a little at a time from the catalyst 22 as the temperature Tc of the catalyst 22 rises.

That is, if the temperature Tc of the catalyst 22 is low when feeding the aqueous urea solution, the urea contained in the aqueous urea solution is stored in the catalyst 22. Next, if the temperature Tc of the catalyst 22 rises, the urea stored in the catalyst 22 successively changes in form to different ammonia generating compounds along with this. As a result, ammonia is gradually released from the catalyst 22.

In this way, if the temperature Tc of the catalyst 22 is low when feeding the aqueous urea solution, the urea contained in the aqueous urea solution is stored in the catalyst 22. So long as the temperature Tc of the catalyst 22 is maintained in the low state, the urea continues to be stored in the catalyst 22. On the other hand, if the aqueous urea solution is fed when the temperature Tc of the catalyst 22 is between about 132° C. and about 350° C., the urea contained in the aqueous urea solution is stored once in the catalyst 22 also. Next, when the temperature of the urea rises and the urea successively changes in form to different ammonia generating compounds, ammonia is released from the catalyst 22. That is, if the aqueous urea solution is fed while the temperature Tc of the catalyst 22 is between about 132° C. to 350° C., the action of release of ammonia from the catalyst 22 is started a little while after that.

In this way, if the aqueous urea solution is fed when the temperature Tc of the catalyst 22 is between about 132° C. and 350° C., the action of release of the ammonia from the catalyst 22 starts in a short while after that. When the temperature Tc of the catalyst 22 is maintained substantially constant, if the aqueous urea solution continues to be fed, ammonia continues to be released from the catalyst 22. In this case, however, the urea stored in the catalyst 22 only changes in form to the ammonia generating compound determined by the temperature Tc of the catalyst 22, so not that much ammonia is generated. Accordingly, in this case, even if aqueous urea solution is fed so that the amount of urea becomes the equivalent ratio for the amount of $NO_x$ in the exhaust gas, all of the $NO_x$ in the exhaust gas will not be completely reduced by the ammonia generated from the catalyst 22.

Further, it is considered that when the aqueous urea solution is fed, some of the urea contained in the aqueous urea solution decomposes by heat in the exhaust gas and therefore ammonia is generated, so part of the $NO_x$ in the exhaust gas is reduced by this ammonia. The amount of this ammonia, however, is also not that large, so the amount of $NO_x$ in the exhaust gas reduced by this ammonia is not that large.

Therefore, when the temperature Tc of the catalyst 22 is maintained at a constant temperature between about 132° C. and 350° C., even if feeding an aqueous urea solution so that the amount of urea becomes the equivalent ratio for the amount of $NO_x$ in the exhaust gas, as shown in FIG. 2, the $NO_x$ purification rate will not become that high. In this case, when the temperature of the exhaust gas becomes higher and the temperature Tc of the catalyst 22 rises along with it, the amount of ammonia generated from the catalyst 22 will increase, while the amount of ammonia generated from the urea in the aqueous urea solution in the exhaust gas will increase as well. Therefore, as shown in FIG. 2, as the temperature Ti of the exhaust gas flowing into the catalyst 22 rises, the $NO_x$ purification rate also gradually rises.

When the temperature Tc of the catalyst 22 is maintained at a substantially constant temperature between about 132° C. to 350° C., it is possible to increase the $NO_x$ purification rate by increasing the amount of ammonia generated from the catalyst 22 and increasing the amount of ammonia generated from the urea in the aqueous urea solution in the exhaust gas. Therefore, it is sufficient to increase the amount of urea fed. Therefore, in this embodiment of the present invention, when the temperature Tc of the catalyst 22 does not change that much between about 132° C. and about 350° C., the amount of the aqueous urea solution fed is increased so that the amount of urea fed becomes an amount of urea more than the equivalent ratio required for reducing the $NO_x$ in the exhaust gas.

In this way, when the temperature Tc of the catalyst 22 does not change that much between about 132° C. and about 350° C., it is possible to increase the $NO_x$ purification rate by feeding a urea in an amount more than the equivalent ratio. If for example, as at the time of acceleration, the temperature of the exhaust gas sharply rises and the temperature Tc of the catalyst 22 sharply rises, even if an amount of urea of more than the equivalent ratio is fed, the $NO_x$ purification rate cannot be increased.

That is, if shifting from a low load operation state to a high load operation state for acceleration, since the temperature of the exhaust gas sharply rises, the temperature Tc of the catalyst 22 also sharply rises. On the other hand, if the engine operation state shifts to a high load operation, the amount of $NO_x$ in the exhaust gas sharply increases. Even if however sharply increasing the amount of the aqueous urea solution fed so as to feed a urea in an amount more than the equivalent ratio required for reducing the $NO_x$ sharply increasing at this time, as explained above, ammonia is not generated from the sharply increased urea for a while. Experiments have found that almost no ammonia is generated from the urea rapidly increased during acceleration operation. Therefore, the amount of ammonia released from the catalyst 22 at the time of acceleration operation becomes much less than the amount of ammonia required for reducing the increased NOX and accordingly a high $NO_x$ purification rate cannot be obtained.

Therefore, in the present invention, in order to obtain a high $NO_x$ purification rate when the amount of $NO_x$ in the exhaust gas increases and the temperature Tc of the catalyst 22 rises such as for example at the time of acceleration operation, a large amount of urea, that is, a large amount of the ammonia generating compound, is stored in the catalyst 22 before the catalyst 22 starts to rise in temperature, a large amount of ammonia is made to be released from the ammonia generating compound stored in the catalyst 22, and that large amount of released ammonia is used to reduce the $NO_x$ in the exhaust gas when the temperature Tc of the catalyst 22 sharply rises.

Explaining this in more detail, in the present invention, it is decided if the temperature region of the catalyst 22 is in the ammonia generating compound storage region where the urea in the aqueous urea solution, that is, the ammonia generating compound, is stored in the catalyst 22 and almost no ammonia is released from the stored ammonia generating compound or in the ammonia release region where ammonia is released at a little at a time from the stored ammonia generating compound. In order to store a sufficient amount of ammonia generating compound in the catalyst 22 in advance for releasing the required amount of ammonia when the temperature of the catalyst 22 becomes the ammonia release region, a sufficient amount of aqueous urea solution required is fed into the catalyst 22 when it is decided that the temperature of the catalyst 22 is in the ammonia generating compound storage region.

Here, the ammonia generating compound storage region indicates a temperature region where the temperature Tc of the catalyst 22 is less than about 132° C., while the ammonia release region indicates a temperature region where the temperature Tc of the catalyst 22 is between about 132° C. and about 350° C. When the temperature Tc of the catalyst 22 is lower than about 132° C., as will be understood from FIG. 4, the urea in the aqueous urea solution fed, that is, the ammonia generating compound, is stored in the catalyst 22. At this time, almost no ammonia is generated from the stored ammonia generating compound. Further, at this time, even if ammonia is generated from the urea in the exhaust gas, the amount is extremely small. Therefore, if an aqueous urea solution is fed when the temperature Tc of the catalyst 22 is in the ammonia generating compound storage region, the majority of the urea in the aqueous urea solution, that is, the ammonia generating compound, is stored in the catalyst 22.

On the other hand, when the temperature Tc of the catalyst 22 is between about 132° C. and about 350° C., that is, when the temperature Tc of the catalyst 22 is in the ammonia release region, ammonia is released from the ammonia generating compound stored in the catalyst 22.

Briefly said, the temperature Tc of the catalyst 22 is in the ammonia generating compound storage region at the time of engine startup, engine warmup, low load operation, and deceleration operation. Therefore, in the present embodiment of the present invention, at the time of engine startup, engine warmup, low load operation, and deceleration operation, a large amount of aqueous urea solution is fed so as to store urea, that is, the ammonia generating compound, in the catalyst 22 to an extent not exceeding the maximum amount of the ammonia generating compound which the catalyst 22 can store. Therefore, at the time of acceleration operation, a large amount of ammonia can be released from the ammonia generating compound stored in the catalyst 22 and therefore the $NO_x$ in the exhaust gas can be purified well.

FIG. 5 shows an example of feed control of the aqueous urea solution. Note that FIG. 5 shows the changes in the required load L, the amount of $NO_x$ in the exhaust gas from the combustion chamber 5, the temperature Tc of the catalyst 22, the amount of feed of the aqueous urea solution, and the amount of ammonia generating compound stored in the catalyst 22. Note that in the amount of feed of the aqueous urea solution of FIG. 5, the broken line shows the amount of feed of the aqueous urea solution by which the amount of urea becomes the equivalent ratio for the $NO_x$ in the exhaust gas, while the solid line shows the amount of the aqueous urea solution actually fed.

In FIG. 5, the operation region I shows the time of engine startup or engine warmup or the time of low load operation including idling. At this time, as shown in FIG. 5, the amount of $NO_x$ in the exhaust gas is small and the temperature Tc of the catalyst 22 is in the ammonia generating compound storage region. At this time, the aqueous urea solution is fed so that the amount of feed of the urea becomes two to four times the amount of urea of the equivalent ratio so that the amount of urea fed becomes more than the amount of urea of the equivalent ratio. Therefore, at this time, the urea stored in the catalyst 22, that is, the amount of storage of the ammonia generating compound, gradually increases.

Next, assume that the required load L has rapidly been raised and the engine is being accelerated. When the required load L is sharply raised, the amount of $NO_x$ in the exhaust gas sharply increases. Further, at this time, the temperature of the exhaust gas sharply rises, so the temperature Tc of the catalyst 22 also sharply rises and the temperature Tc of the catalyst 22 enters the ammonia release region. At this time, a large amount of ammonia is released from the ammonia generating compound stored in the catalyst 22 and the $NO_x$ in the exhaust gas is purified well by the released ammonia. In this way, since a large amount of ammonia is released from the ammonia generating compound at this time, the amount of the ammonia generating compound stored in the catalyst 22 sharply falls.

On the other hand, when all of the $NO_x$ in the exhaust gas cannot be reduced by the ammonia generated from the ammonia generating compound stored in the catalyst 22, aqueous urea solution is fed, even while the engine is being accelerated, to reduce the remaining $NO_x$ in the exhaust gas by the ammonia generated from the urea in the aqueous urea solution in the exhaust gas. In the example shown in FIG. 5, when the engine starts to be accelerated, the amount of feed of the aqueous urea solution is reduced once, then increased. Of course, when the $NO_x$ in the exhaust gas can be sufficiently purified by the ammonia generated from the ammonia generating compound stored in the catalyst 22 at the time of acceleration operation, the feed of the aqueous urea solution may be stopped at the time of acceleration operation.

Next, assume that at the operation region II the engine is being operated steadily and that the temperature Tc of the catalyst 22 is maintained at the ammonia release region at that time. At this time, in the example shown in FIG. 5, the aqueous urea solution is fed so that the amount of feed of the urea becomes more than the amount of urea of the equivalent ratio so as to purify well the $NO_x$ in the exhaust gas. Therefore, at this time, the amount of the ammonia generating compound stored in the catalyst 22 is increased a little at a time.

Next, assume that at the operation region III the required load L is increased, then the engine operated steadily under a high load and that at the operation region III the temperature Tc of the catalyst 22 exceeds about 350° C. and the temperature Tc of the catalyst 22 is maintained at over about 350° C. under a high load operation state. In this case, if the temperature Tc of the catalyst 22 rises in the operation region III, the amount of ammonia released from the ammonia generating compound stored in the catalyst 22 increases and therefore the amount of ammonia generating compound stored in the catalyst 22 decreases. Further, in the example shown in FIG. 5, the amount of feed of the aqueous urea solution is reduced at this time as well.

On the other hand, when the temperature Tc of the catalyst 22 exceeds about 350° C., as explained above, all of the urea in the aqueous urea solution fed is immediately decomposed by heat into ammonia and the $NO_x$ in the exhaust gas is immediately reduced by this ammonia. Therefore, if making the amount of urea fed at this time the equivalent ratio for the amount of $NO_x$ in the exhaust gas, the $NO_x$ in the exhaust gas can be completely purified. Therefore, as shown in FIG. 5, when the temperature Tc of the catalyst 22 becomes more than about 350° C., the aqueous urea solution is fed so that the amount of urea fed becomes the equivalent ratio for the amount of $NO_x$ in the exhaust gas. Note that at this time, no ammonia generating compound at all is stored in the catalyst 22. Therefore, at this time, as shown in FIG. 5, the amount of the ammonia generating compound stored in the catalyst 22 becomes zero.

Next, assume that the engine is being decelerated and the supply of fuel is stopped. At this time, the amount of $NO_x$ in the exhaust gas becomes zero and the temperature Tc of the catalyst 22 sharply falls. At this time, in the example shown in FIG. 5, in the same way as the operation region I, the aqueous urea solution is fed so that the amount of urea fed becomes more than the amount of urea of the equivalent ratio for the amount of $NO_x$ in the exhaust gas at the time of low load operation. Therefore, when the engine starts to be decelerated, the amount of ammonia generating compound stored in the catalyst 22 is increased.

If more than the equivalent ratio of the urea is fed when the temperature Tc of the catalyst 22 becomes more than about 350° C., ammonia is discharged into the atmosphere. Therefore, when the temperature Tc of the catalyst 22 becomes more than about 350° C., it is necessary to control the amount of the aqueous urea solution fed to precisely match the equivalent ratio.

On the other hand, even when the temperature Tc of the catalyst 22 becomes less than about 350° C., if the amount of feed of the aqueous urea solution is increased by an extreme amount, ammonia is discharged into the atmosphere. Therefore, at this time as well, it is required that the aqueous urea solution be fed so that no ammonia is discharged into the atmosphere. Note that experiments of the present inventors have confirmed that when changing the engine operation state by a fixed pattern and changing the temperature Tc of the catalyst 22 between about 190° C. and about 350° C. at this time, when using a vanadium titania catalyst as the catalyst 22, no ammonia is discharged into the atmosphere even if feeding a urea in an amount close to three times the amount of urea of the equivalent ratio and that when using a copper zeolite catalyst as the catalyst 22, no ammonia is discharged into the atmosphere even if feeding a urea in an amount more than four times the amount of urea of the equivalent ratio.

The reason why the amount of ammonia discharged into the atmosphere is smaller when using a copper zeolite catalyst compared with when using a vanadium titania catalyst is believed to be as follows. That is, if part of the ammonia generated from the ammonia generating compound is used for reduction of the $NO_x$ in the exhaust gas on the surface of the copper or vanadium and the remaining ammonia is held on the surface of the copper or vanadium, that ammonia becomes NO ($NH_3 \rightarrow NO$). Next, this NO reacts with the remaining ammonia to become $N_2$ (NO+ $NH_3 \rightarrow N_2$). If this successive reaction occurs, the remaining ammonia will no longer be discharged into the atmosphere.

Vanadium has a low ability to hold ammonia. Therefore, such a successive reaction does not easily occur and therefore ammonia is easily discharged into the atmosphere. As opposed to this, copper has a high ability to hold ammonia and therefore such a successive reaction easily occurs and ammonia is not easily discharged into the atmosphere. Accordingly, it is preferable to use a copper zeolite catalyst to suppress the discharge of ammonia into the atmosphere.

Next, a first embodiment of the feed control of an aqueous urea solution according to the present invention will be explained.

Figure 6A:
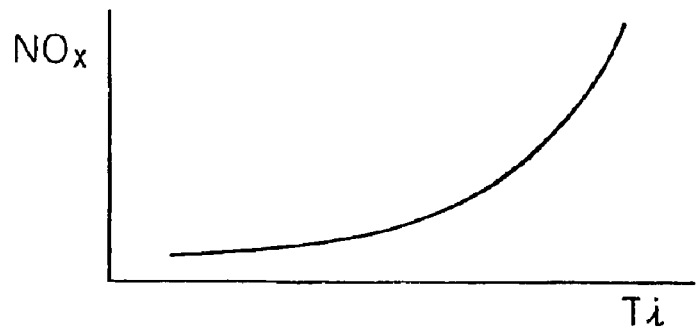
FIGS. 6A, 6B, and 6C are views of the equivalent ratio of urea required for reducing $NO_x$ in exhaust gas.
Figure 6B:
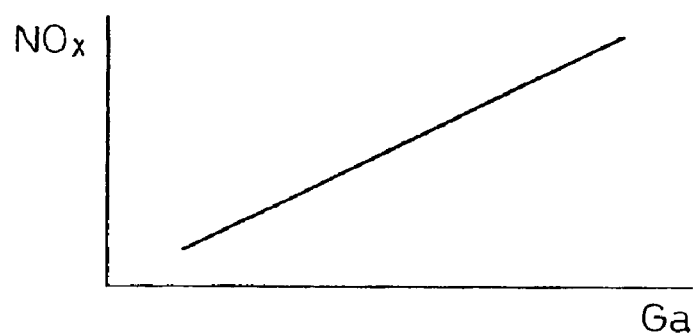
Figure 6C:
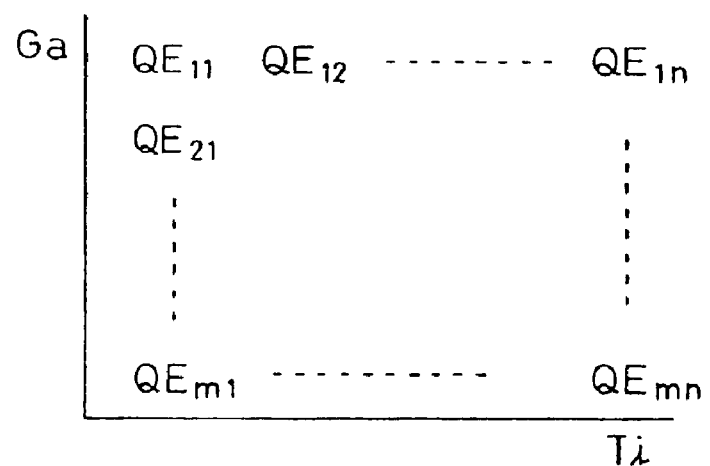

The amount of $NO_x$ discharged from the combustion chamber 5 per unit time increases along with an increase in the engine load. Therefore, as shown in FIG. 6A, the amount of $NO_x$ discharged from the combustion chamber 5 per unit time becomes greater the higher the temperature Ti of the exhaust gas flowing to the catalyst 22. Further, as shown in FIG. 6B, the amount of $NO_x$ discharged from the combustion chamber 5 per unit time is proportional to the amount Ga of intake air. Therefore, the amount QE of urea per unit time giving the equivalent ratio for the amount of $NO_x$ in the exhaust gas becomes a function of the temperature Ti of the exhaust gas and the amount Qa of the intake air. In this embodiment of the present invention, the amount QE of urea of the equivalent ratio to be fed per unit time is stored in advance in the ROM 42 in the form of a map as shown in FIG. 6C as a function of the temperature Ti of the exhaust gas and the amount Ga of the intake air.

Note that instead of calculating the amount QE of urea based on the temperature Ti of the exhaust gas and the amount Qa of the intake air, it is also possible to detect the actual concentration of $NO_x$ in the exhaust gas and calculate the amount QE of urea from the concentration of $NO_x$. In this case, an $NO_x$ concentration sensor is attached in the exhaust pipe 21 upstream of the catalyst 22, the amount of $NO_x$ discharged from the combustion chamber 5 per unit time is found from the concentration of $NO_x$ detected by the $NO_x$ concentration sensor and the amount Ga of the intake air, and the amount QE of urea per unit time giving the equivalent ratio for the amount of $NO_x$ is calculated based on this amount of $NO_x$.

On the other hand, when the aqueous urea solution is fed, part of the urea contained in the aqueous urea solution is decomposed by heat in the exhaust gas and generates ammonia. In this case, the amount of urea decomposed by heat increases the higher the temperature Ti of the exhaust gas flowing to the catalyst 22. Therefore, when the aqueous urea solution is fed, the storage ratio ST of the urea stored in the catalyst 22 falls the higher the temperature Ti of the exhaust gas as shown in FIG. 7.

Figure 8A:
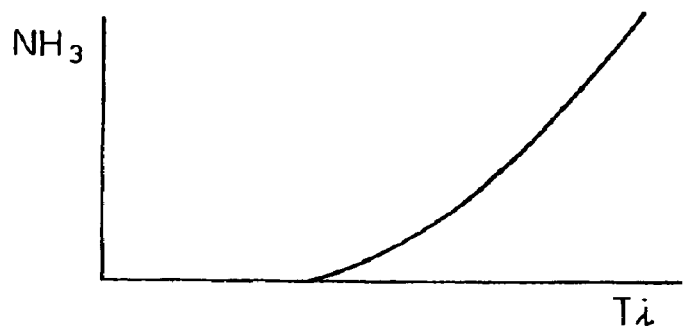
FIGS. 8A, 8B, and 8C and FIGS. 9A, 9B, and 9C are views of the ratio of release of ammonia.
Figure 8B:
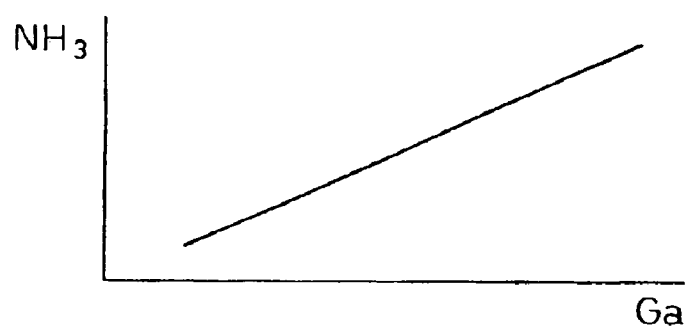
Figure 8C:
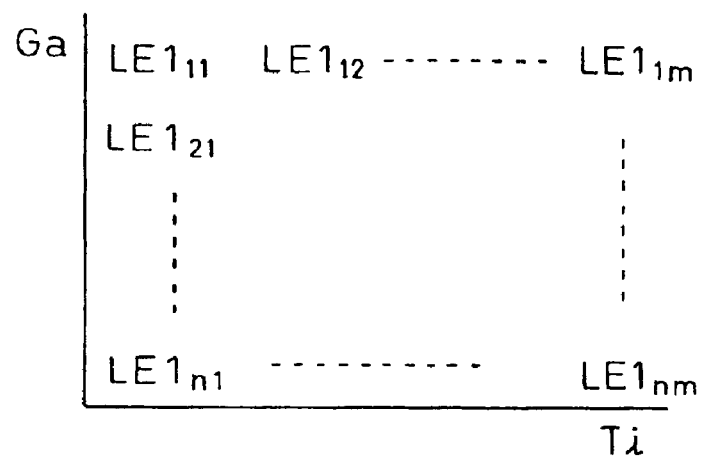

Further, at the time of steady state operation when the temperature Tc of the catalyst 22 does not change that much, as explained above, the amount of ammonia released from the ammonia generating compound stored in the catalyst 22 increases along with the rise of the temperature Tc of the catalyst 22. Therefore, at this time, as shown in FIG. 8A, the ratio $NH_3$ of ammonia released per unit time from the ammonia generating compound stored in the catalyst 22 increases the higher the temperature Ti of the exhaust gas flowing into the catalyst 22. On the other hand, the faster the space velocity of the exhaust gas, the greater the amount of ammonia released from the ammonia generating compound stored in the catalyst 22. Therefore, as shown in FIG. 8B, the ratio $NH_3$ of ammonia released per unit time from the ammonia generating compound stored in the catalyst 22 increases the greater the amount Ga of intake air. In this embodiment of the present invention, the ratio LE1 of ammonia released per unit time from the ammonia generating compound stored in the catalyst 22 at the time of steady state operation is stored in advance in the ROM 42 in the form of a map as shown in FIG. 8C as a function of the temperature Ti of exhaust gas and the amount Ga of intake air.

Figure 9A:
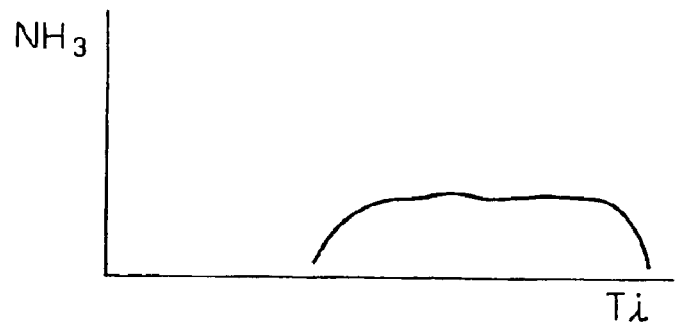
Figure 9B:
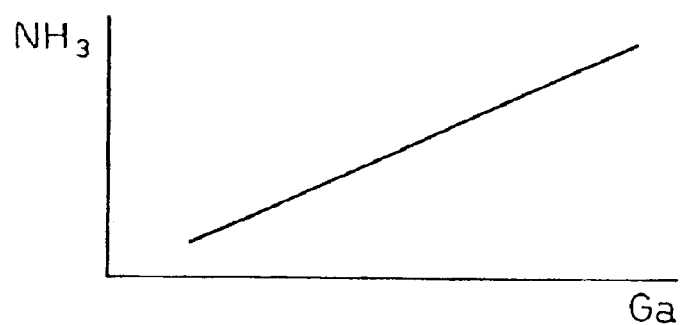
Figure 9C:
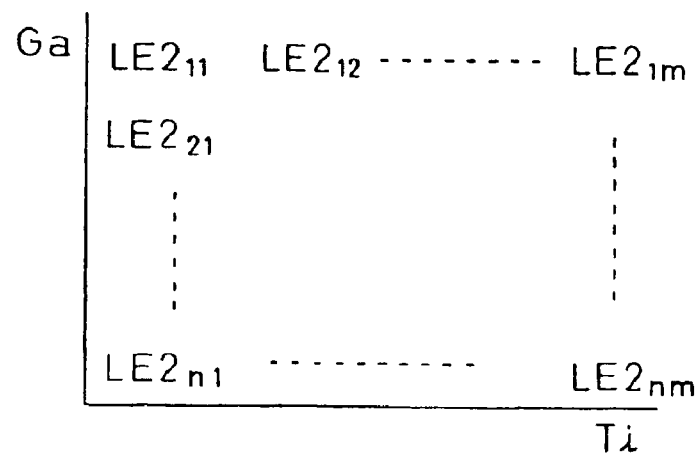

On the other hand, when the temperature of the catalyst 22 sharply rises such as the time of acceleration operation, ammonia is released at a little at a time from the ammonia generating compound stored in the catalyst 22 before the rise of temperature of the catalyst 22 as explained before. The ratio $NH_3$ of the ammonia released per unit time from the ammonia generating compound stored in the catalyst 22 at this time changes in accordance with the temperature Ti of the exhaust gas flowing into the catalyst 22 as shown in FIG. 9A. Further, in this case as well, as shown in FIG. 9B, the ratio $NH_3$ of ammonia released per unit time from the ammonia generating compound stored in the catalyst 22 increases the greater the amount Ga of intake air. In this embodiment of the present invention, when the temperature Tc of the catalyst 22 sharply rises, the ratio LE2 of the ammonia released per unit time from the ammonia generating compound stored in the catalyst 22 is stored in advance in the ROM 42 in the form of a map as shown in FIG. 9C as a function of the temperature Ti of the exhaust gas and the amount Ga of the intake air.

Figure 11:
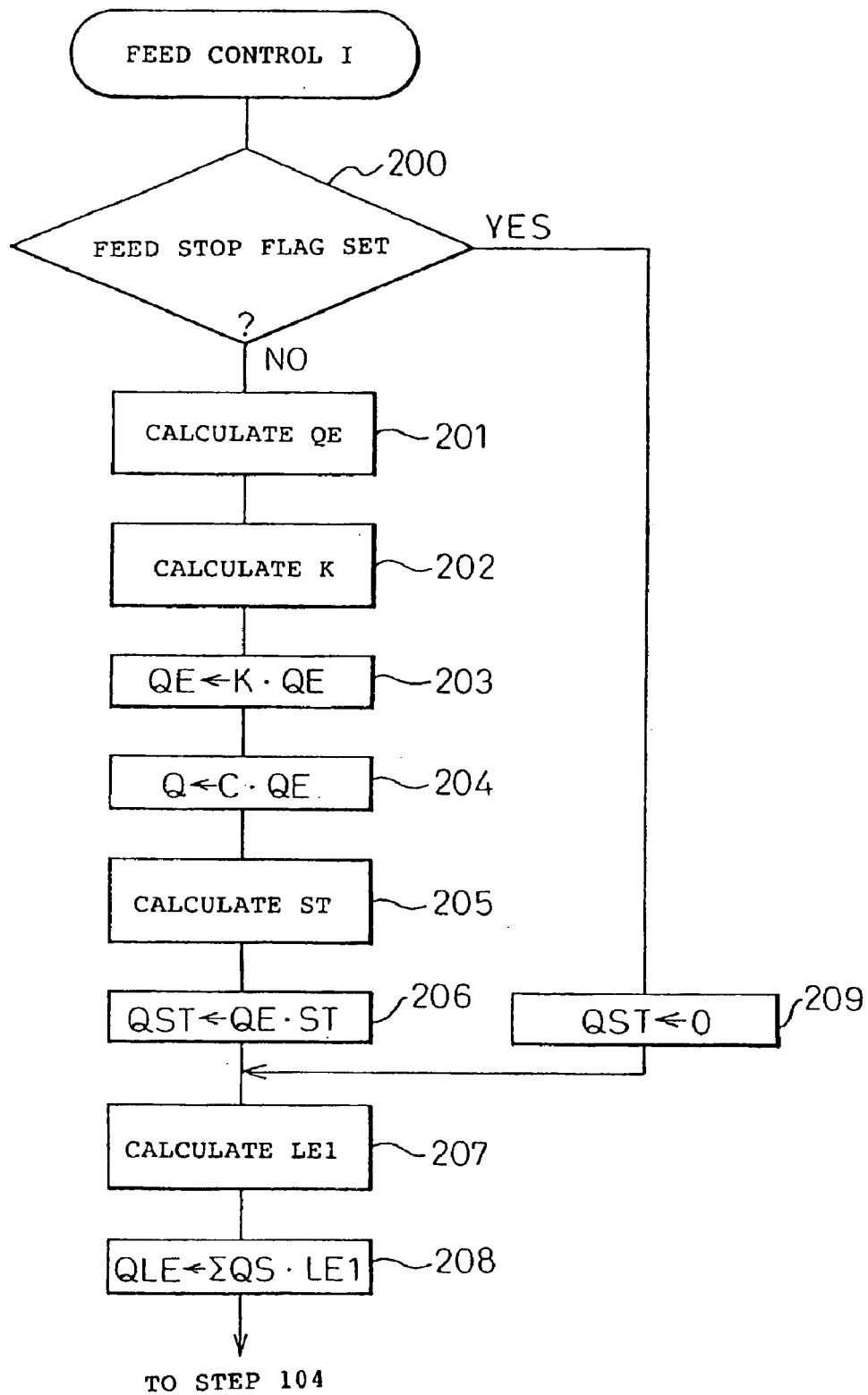
Figure 12:
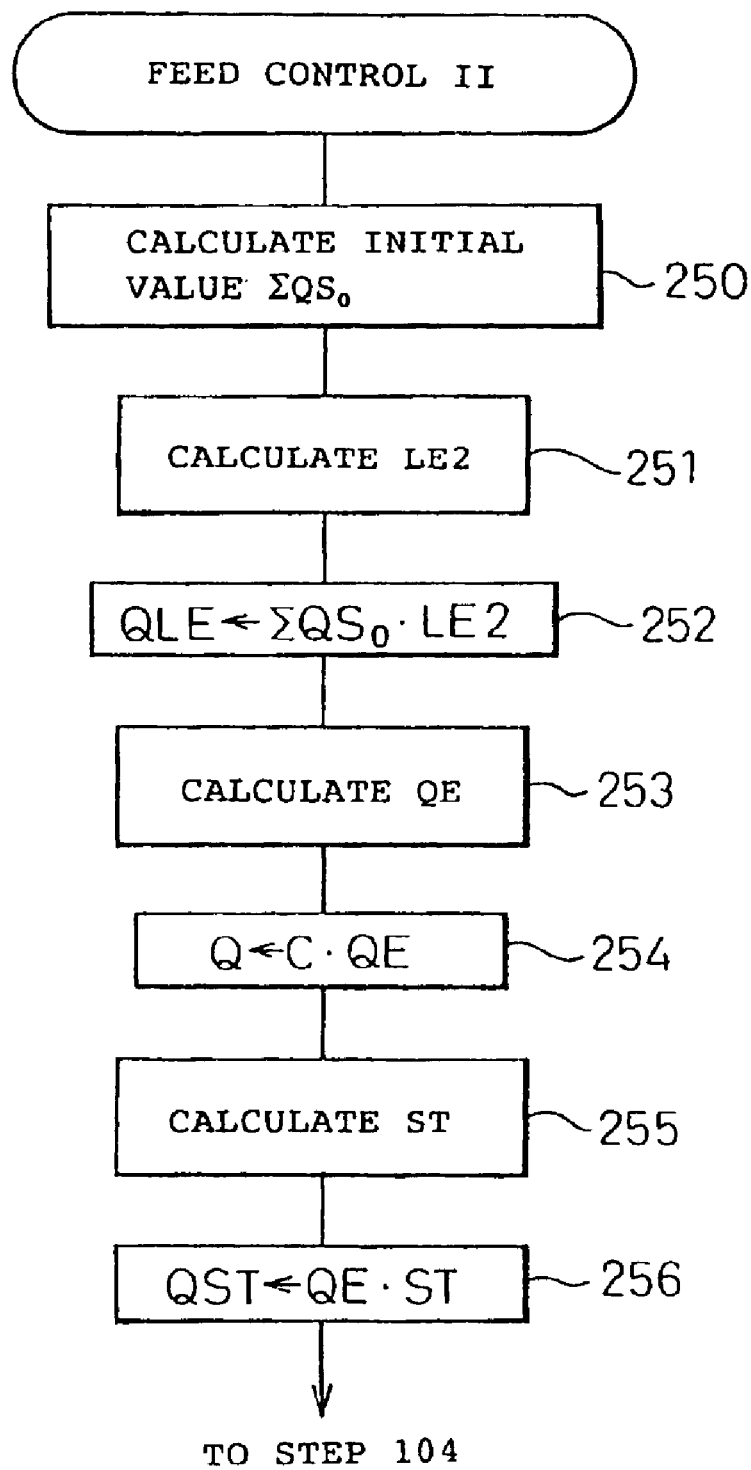

FIG. 10 to FIG. 12 show a routine for executing the first embodiment of the feed control of a aqueous urea solution. This routine is executed by interruption every predetermined time period.

Referring to FIG. 10, first, at step 100, it is determined if the engine is starting up. When the engine is starting up, the routine jumps to step 102, while when it is not starting up, the routine proceeds to step 101. At step 101, it is determined if the engine is being decelerated. If the engine is being decelerated, the routine proceeds to step 102. At step 102, the EGR control valve 25 is made to close and the feed of the EGR gas is stopped. Next, the routine proceeds to step 103, where the feed control I is executed, then the routine proceeds to step 104. This feed control I is shown in FIG. 11.

On the other hand, when it is determined at step 101 that the engine is not being decelerated, the routine proceeds to step 109, where it is determined if the temperature Ti of the exhaust gas detected by the temperature sensor 35 is higher than a predetermined temperature, for example, 350° C. When Ti is not more than 350° C., the routine proceeds to step 110, where it is determined if the engine is being accelerated. When it is not being accelerated, the routine proceeds to step 103. That is, the routine proceeds to step 103 when the engine is starting up and being decelerated and when Ti≦350° C. and the engine is not being accelerated.

Here, an explanation will be given of the feed control I performed at step 103 while referring to FIG. 11.

Referring to FIG. 11, first, at step 200, it is determined if a feed stop flag showing that the feed of the aqueous urea solution should be stopped has been set or not. When the feed stop flag has not been set, the routine proceeds to step 201, where the amount QE of urea of the equivalent ratio to be fed per unit time is calculated from the map shown in FIG. 6C based on the output signals of the air flow meter 14 and the temperature sensor 35.

Figure 13:
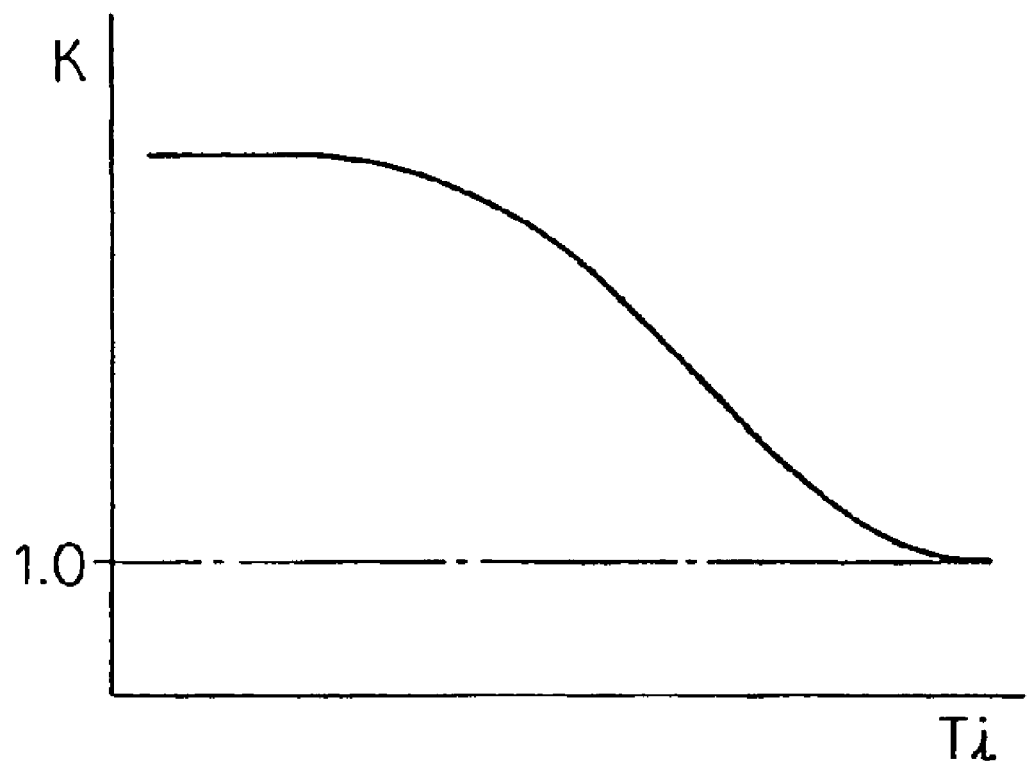
FIG. 13 is a view of the ratio of increase of urea.

Next, at step 202, the ratio of the actual amount of urea fed to the equivalent ratio, that is, the ratio K of increase of urea, is calculated. This ratio K of increase of urea, as shown in FIG. 13, is larger than 1.0. The ratio K of increase of urea becomes smaller as the temperature Ti of the exhaust gas flowing to the catalyst 22 becomes higher. In the example shown in FIG. 13, when the temperature Ti of the exhaust gas is low, the ratio K of increase of urea is made about 4.0. Next, at step 203, the ratio K of increase of urea is multiplied with the amount QE of urea of the equivalent ratio to be fed per unit time so as to calculate the amount QE of urea (=K·QE) to be actually fed per unit time.

Next, at step 204, a correction coefficient C is multiplied with the amount QE of urea so as to calculate the amount Q of the aqueous urea solution to be fed per unit time. When using an aqueous urea solution of 30 wt % as the aqueous urea solution, the value of this correction coefficient C becomes (100+30)/30=4.3. When the amount Q of feed of the aqueous urea solution per unit time is calculated, the feed control valve 33 is controlled so that the amount of feed of the aqueous urea solution becomes Q.

Next, at step 205, the storage ratio ST of urea is calculated from FIG. 7. Next, at step 206, the amount QE of feed of urea is multiplied with the storage ratio ST of urea so as to calculate the amount QST of urea (=QE·ST) stored in the catalyst 22 per unit time. Next, at step 207, the ratio LE1 of release of ammonia is calculated from the map shown in FIG. 8C. Next, at step 208, the ratio LE1 of release is multiplied with the total amount ΣQS of the ammonia generating compound stored in the catalyst 22 so as to calculate the amount QLE of ammonia (=ΣQS·LE1) released per unit time. Next, the routine proceeds to step 104 of FIG. 10.

On the other hand, when it is determined at step 200 that the feed stop flag has been set, the routine proceeds to step 209, where the amount QST of urea stored per unit time is made zero, then the routine proceeds to step 207. At this time, the feed of the aqueous urea solution is stopped. Therefore, when the engine is starting up or being decelerated or when Ti≦350° C. and the engine is not being accelerated, the aqueous urea solution is fed so that the amount of feed of the urea becomes the amount of urea of the equivalent ratio so long as the feed stop flag is not set.

At step 104 of FIG. 10, the total amount ΣQS of ammonia generating compound stored in the catalyst 22 is calculated based on the following equation:

ΣQS=ΣQS+QST−QLE.

Next, at step 105, it is determined if the amount ΣQS of the ammonia generating compound stored exceeds the maximum amount of storage MAX (FIG. 5). When ΣQS>MAX, the routine proceeds to step 108, where the feed stop flag is set. When the feed stop flag is set, the feed of the aqueous urea solution is stopped. On the other hand, when it is determined at step 105 that ΣQS≦MAX, the routine proceeds to step 106, where it is determined if ΣQS has become smaller than a certain value MIN (<MAX). When ΣQS<MIN, the routine proceeds to step 107, where the feed stop flag is reset.

On the other hand, when it is determined at step 110 that the engine is being accelerated, the routine proceeds to step 111, where the feed control II is executed. This feed control II is shown in FIG. 12.

Referring to FIG. 12, first, at step 250, at the time of start of acceleration operation, the total amount of ammonia generating compound stored in the catalyst 22 is made the initial value $\Sigma QS_0$. Next, at step 251, the ratio LE2 of release of ammonia is calculated from the map shown in FIG. 9C. Next, at step 252, the ratio LE2 of release is multiplied with the initial value $\Sigma QS_0$ of the total ammonia generating compound stored in the catalyst 22 to calculate the amount QLE of ammonia (=$\Sigma QS_0 \cdot LE2$) released per unit time.

Next, at step 253, the amount QE of urea necessary for reducing the $NO_x$ in the exhaust gas which could not be reduced by the ammonia released from the ammonia generating compound in the catalyst 22 is calculated. Next, at step 254, the correction coefficient C mentioned above is multiplied with the amount QE of urea to calculate the amount Q of the aqueous urea solution to be fed per unit time. When the amount Q of feed of the aqueous urea solution per unit time is calculated, the feed control valve 33 is controlled so that the amount of feed of the aqueous urea solution becomes Q.

Next, at step 255, the storage ratio ST of urea is calculated from FIG. 7. Next, at step 256, the amount QE of feed of urea is multiplied with the storage ratio ST of urea to calculate the amount QST of urea (=$QE \cdot ST$) stored in the catalyst 22 per unit time. Next, the routine proceeds to step 104 of FIG. 10.

On the other hand, when it is determined at step 109 of FIG. 10 that Ti>350° C., the routine proceeds to step 112, where the amount QE of urea of the equivalent ratio to be fed per unit time is calculated from the map shown in FIG. 6C based on the output signals of the air flow meter 14 and the temperature sensor 35. Next, at step 113, the correction coefficient C mentioned above is multiplied with the amount QE of urea to calculate the amount Q of the aqueous urea solution to be fed per unit time. When the amount Q of feed of aqueous urea solution per unit time is calculated, the flow control valve 33 is controlled so that the amount of feed of the aqueous urea solution becomes Q. Next, at step 114, the amount $\Sigma QS$ of storage of ammonia generating compound in the catalyst 22 is made zero. In this way, when Ti>350° C., the aqueous urea solution is fed so that the amount of feed of urea becomes the amount of urea of the equivalent ratio.

Next, an explanation will be given of a second embodiment with reference to FIG. 14 and FIG. 15.

When the amount of feed of the aqueous urea solution is small, the aqueous urea solution disperses in the exhaust gas. If the aqueous urea solution disperses in the exhaust gas, the urea in the aqueous urea solution will easily decompose by the heat and as a result it will become difficult to store the urea fed in the catalyst 22. As opposed to this, if the amount of feed of the aqueous urea solution is increased, the density of the urea in the exhaust gas will become higher and as a result the urea will become harder to decompose by heat, so the urea fed will be able to be stored in the catalyst 22.

Figure 14:
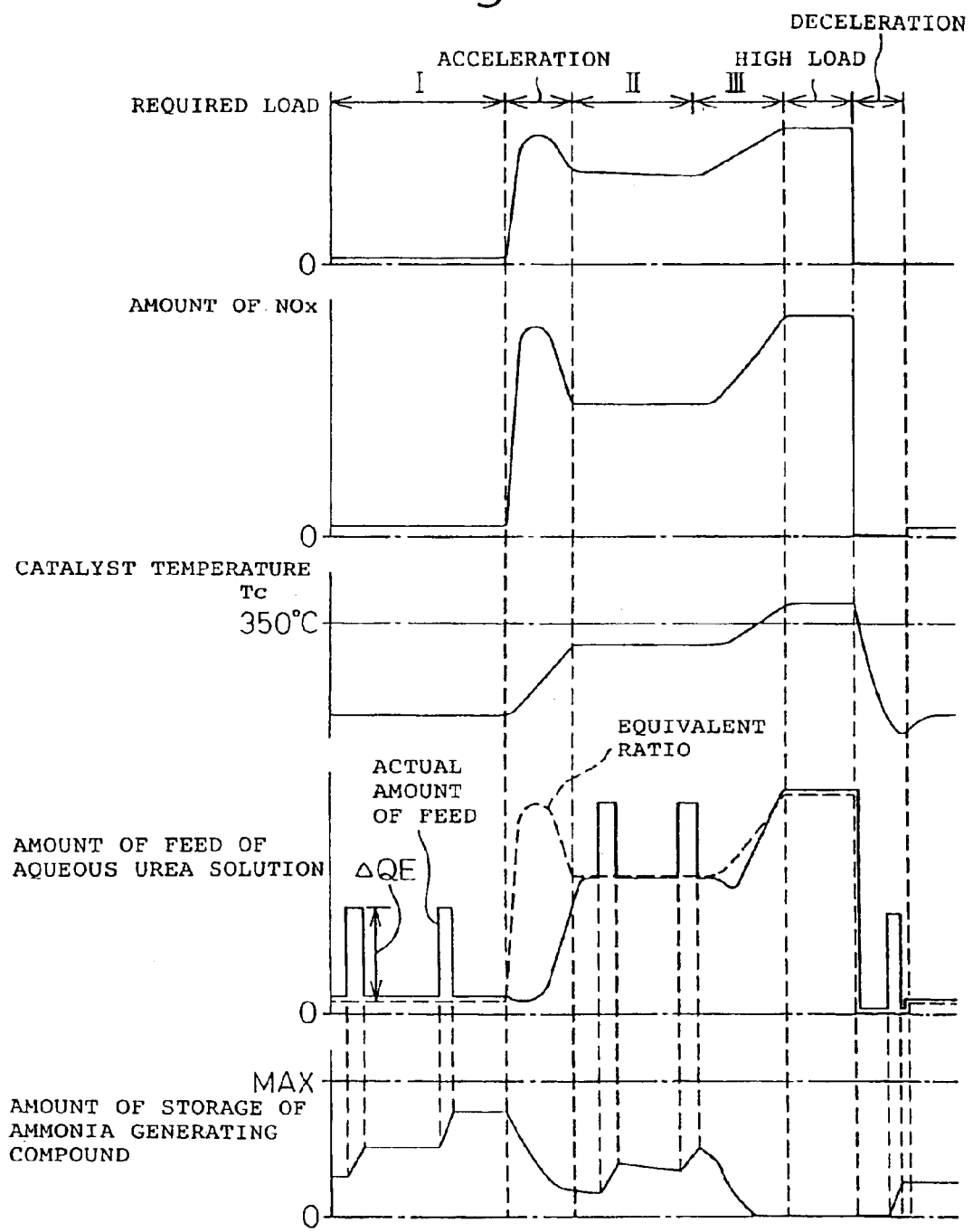
FIG. 14 is a time chart of the $NO_x$ reduction processing.

Therefore, in the second embodiment, as shown in FIG. 14, in the operation region I, operation region II, and at the time of deceleration, the aqueous urea solution is fed so that the amount of urea to be fed becomes the amount of urea of the equivalent ratio, the urea is used to reduce the $NO_x$ in the exhaust gas, and large amounts of aqueous urea solution are fed in pulses at certain time intervals to make the urea in the aqueous urea solution be stored in the catalyst 22.

Figure 15:
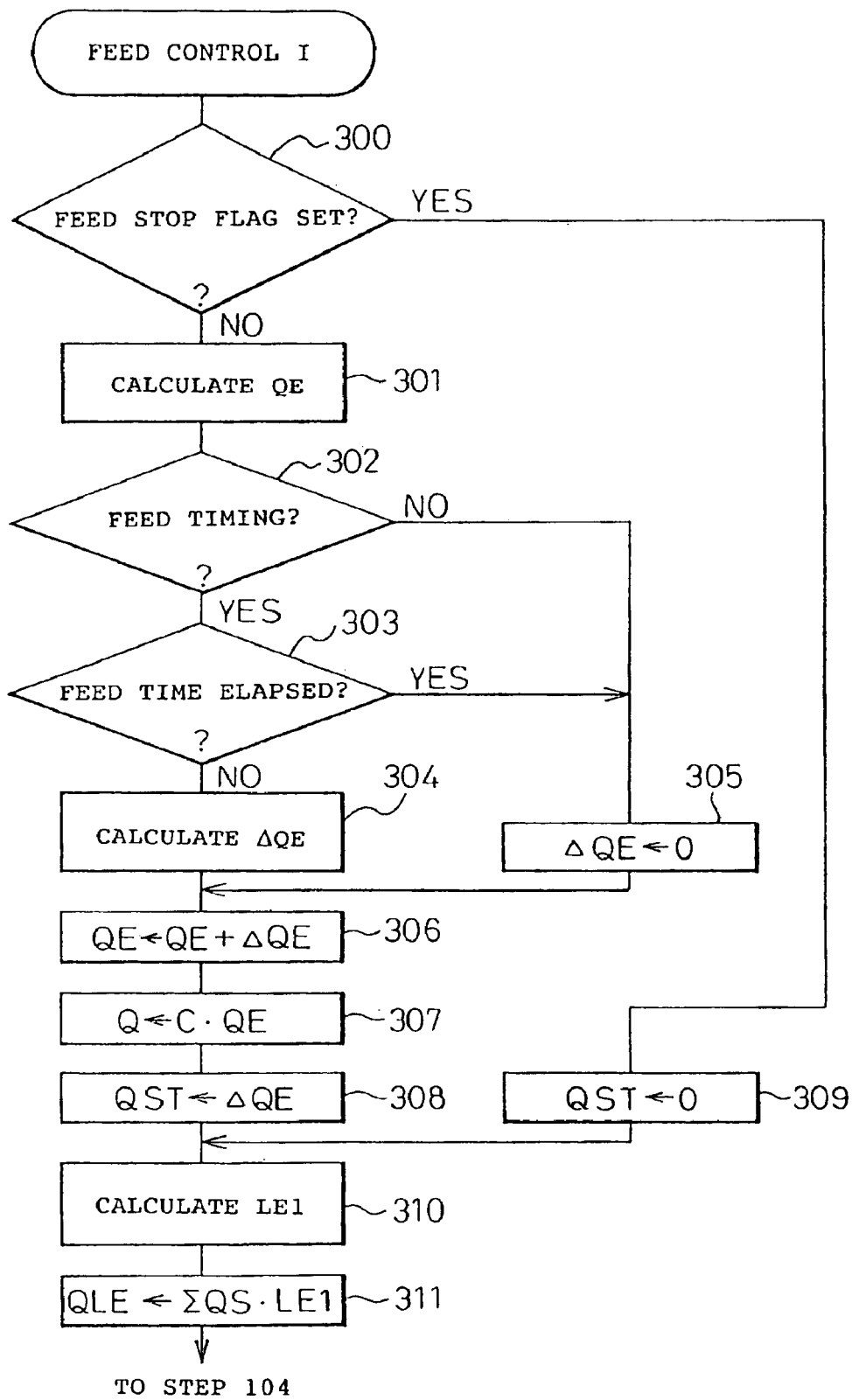
FIG. 15 is a flow chart for the execution of a feed control I.

Note that in the second embodiment as well, the routine shown in FIG. 10 is used, but the routine shown in FIG. 15 is used for just step 103 of FIG. 10.

Referring to FIG. 15, first at step 300, it is determined if the feed stop flag showing that the feed of aqueous urea solution should be stopped has been set. When the feed stop flag has not been set, the routine proceeds to step 301, where the amount QE of urea of the equivalent ratio to be fed per unit time is calculated from the map shown in FIG. 6C based on the output signals of the air flow meter 14 and temperature sensor 35. Next, at step 302, it is determined if the timing is the feed timing for feeding a large amount of aqueous urea solution in a pulse in a short time. If the timing is the feed timing, the route proceeds to step 303, where it is determined if the feed time of the aqueous urea solution has elapsed. When the feed time of the aqueous urea solution has not elapsed, the routine proceeds to step 304.

At step 304, the amount $\Delta QE$ of aqueous urea solution per unit time to be fed in a pulse is calculated. The amount $\Delta QE$ of aqueous urea solution is determined so that the amount of urea fed becomes a predetermined amount of urea more than several times the amount of urea of the equivalent ratio at the time of low load operation. Next, at step 306, the additional amount $\Delta QE$ of urea is added to the amount QE of urea calculated at step 301 to calculate the final amount QE of urea (=$QE+\Delta QE$). Next, at step 307, the correction coefficient C mentioned above is multiplied with the amount QE of urea to calculate the amount Q of the aqueous urea solution to be fed per unit time. When the amount Q of feed of the aqueous urea solution per unit time is calculated, the flow control valve 33 is controlled so that the amount of feed of the aqueous urea solution becomes Q.

Next, at step 308, the additional amount $\Delta QE$ of urea is made the amount QST of urea stored in the catalyst 22 per unit time. Next, at step 310, the ratio LE1 of release of ammonia is calculated from the map shown in FIG. 8C. Next, at step 311, the ratio LE1 of release is multiplied with the total amount $\Sigma QS$ of the ammonia generating compound stored in the catalyst 22 to calculate the amount QLE of ammonia (=$\Sigma QS \cdot LE1$) released per unit time. Next, the routine proceeds to step 104 of FIG. 10.

On the other hand, when it is determined at step 302 that the timing is not the feed timing or when it is determined at step 303 that the feed time has elapsed, the routine proceeds to step 305, where the additional amount $\Delta QE$ of urea is made zero, then the routine proceeds to step 306. At this time, the amount of urea fed is made the equivalent ratio.

On the other hand, when it is determined at step 300 that the feed stop flag has been set, the routine proceeds to step 309, where the amount QST of urea stored per unit time is made zero, then the routine proceeds to step 310. At this time, the feed of the aqueous urea solution is stopped.

Figure 16:
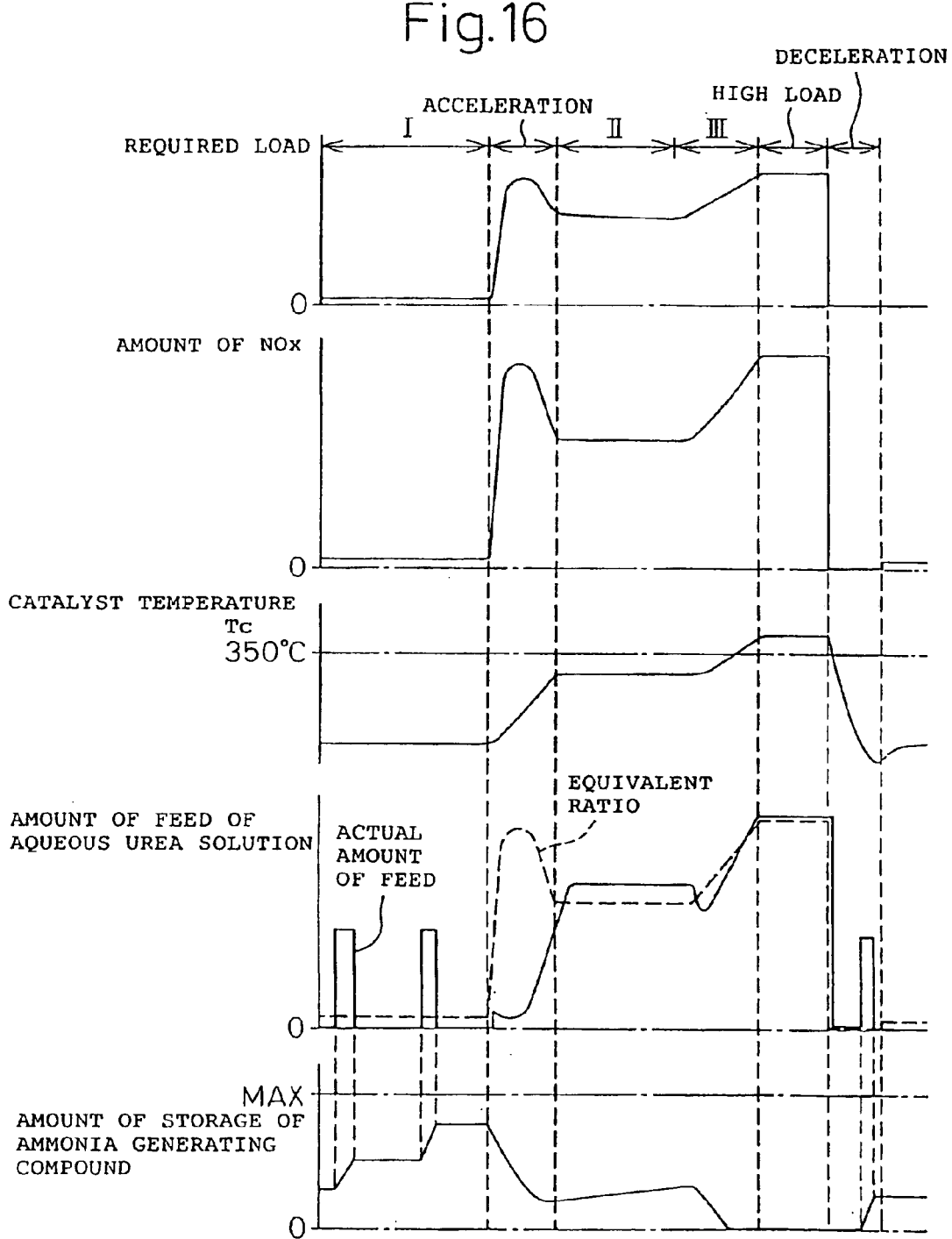
FIG. 16 is a time chart of the $NO_x$ reduction processing.

Next, an explanation will be given of a third embodiment while referring to FIG. 16 and FIG. 17.

When the temperature of the exhaust gas is low, the amount of $NO_x$ in the exhaust gas becomes extremely small. Therefore, in this third embodiment, when the temperature Ti of the exhaust gas flowing into the catalyst 22 is lower than a predetermined value $T_0$, for example, 132° C., the continuous feed of the aqueous urea solution is stopped and, as shown in FIG. 16, in the operation region I and at the time of deceleration, large amounts of aqueous urea solution are fed in pulses at time intervals to make the urea in the aqueous urea solution be stored in the catalyst 22.

Figure 17:
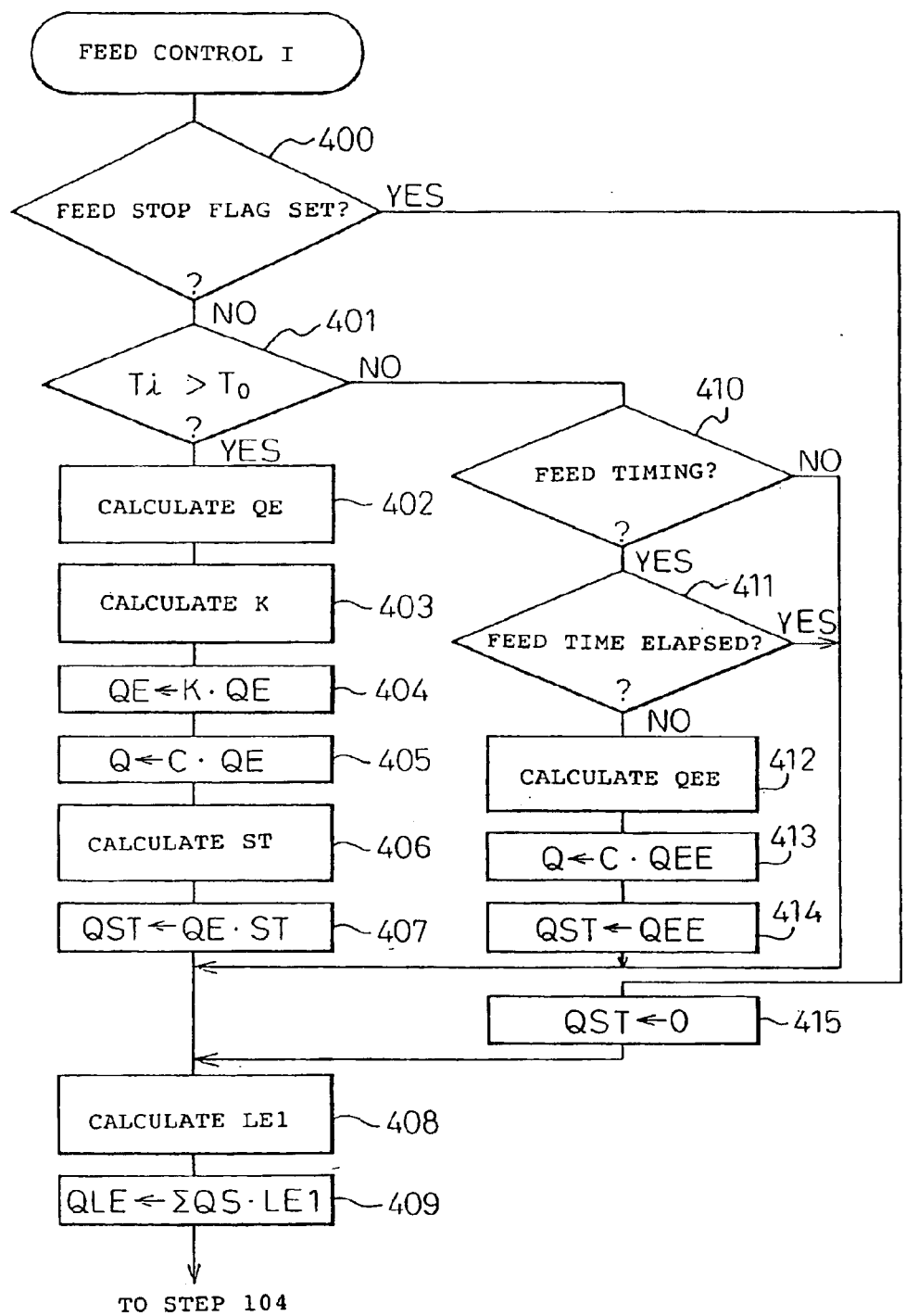
FIG. 17 is a flow chart for the execution of a feed control II.

Note that in the third embodiment as well, the routine shown in FIG. 10 is used, but the routine shown in FIG. 17 is used only for step 103 of FIG. 10.

Referring to FIG. 17, first, at step 400, it is determined if the feed stop flag indicating that the feed of the aqueous urea solution should be stopped has been set. When the feed stop flag has not been set, the routine proceeds to step 401, where it is determined if the temperature Ti of the exhaust gas flowing to the catalyst 22 is higher than a predetermined value $T_0$, for example, 132° C., from the output signal of the temperature sensor 35. When $T_i > T_0$, the routine proceeds to step 402, where the amount QE of urea of the equivalent ratio to be fed per unit time is calculated from the map shown in FIG. 6C based on the output signals of the air flow meter 14 and temperature sensor 35.

Next, at step 403, the ratio K of increase of urea is calculated from FIG. 13. Next, at step 404, the ratio K of increase of urea is multiplied with the amount QE of urea of the equivalent ratio to be fed per unit time so as to calculate the amount QE of urea (=K·QE) to be actually fed per unit time. Next, at step 405, the correction coefficient C mentioned above is multiplied with the amount QE of urea to calculate the amount Q of the aqueous urea solution to be fed per unit time. When the amount Q of feed of aqueous urea solution per unit time is calculated, the flow control valve 33 is controlled so that the amount of feed of the aqueous urea solution becomes Q.

Next, at step 406, the storage ratio ST of urea is calculated from FIG. 7. Next, at step 407, the amount QE of feed of urea is multipled with the storage ratio ST of urea to calculate the amount QST (=QE·ST) stored in the catalytic converter 22 per unit time. Next, at step 408, the ratio LE1 of release of ammonia is calculated from the map shown in FIG. 8C. Next, at step 409, the ratio LE1 of release is multiplied with the total amount ΣQS of the ammonia generating compound stored in the catalyst 22 to calculate the amount QLE of ammonia (=ΣQS·LE1) released per unit time. Next, the routine proceeds to step 104 of FIG. 10.

On the other hand, when it is determined at step 401 that $T_i \leq T_0$, the routine proceeds to step 410, where it is determined if the timing is a feed timing for feeding a large amount of an aqueous urea solution in a pulse in a short time. If the feed timing, the routine proceeds to step 411, where it is determined if the feed time of the aqueous urea solution has elapsed or not. When the feed time of the aqueous urea solution has not elapsed, the routine proceeds to step 412.

At step 412, the amount QEE of urea per unit time to be fed in a pulse is calculated. This amount QEE of urea is determined to give a predetermined amount of urea more than several times the amount of urea of the equivalent ratio. Next, at step 413, the correction coefficient C mentioned above is multiplied with the amount QEE of urea to calculate the amount Q of the aqueous urea solution to be fed per unit time. When the amount Q of feed of the aqueous urea solution per unit time is calculated, the flow control valve 33 is controlled so that the amount of feed of the aqueous urea solution becomes Q. Next, at step 414, QEE is made the amount QST of urea stored in the catalyst 22 per unit time. Next, the routine proceeds to step 408.

On the other hand, when it is determined at step 400 that the feed stop flag has been set, the routine proceeds to step 415, where the amount QST of urea stored per unit time is made zero, then the routine proceeds to step 408. At this time, the feed of the aqueous urea solution is stopped.

Note that in the second embodiment and the third embodiment, it is possible to change the amount and timing of feed of the pulse-like fed aqueous urea solution. For example, it is also possible to reduce the amount of feed of the aqueous urea solution at the time of deceleration a little at a time with each pulse-like feed. Further, to wait for the temperature Tc of the catalyst 22 to sufficiently fall, it is also possible to extend the interval until the aqueous urea solution is fed after the start of deceleration the higher the temperature Tc of the catalyst 22 at the time of start of deceleration.

Next, an explanation will be given of various examples of the catalyst 22 held in the catalytic converter 23 while referring to FIG. 18 and FIG. 19.

Figure 18A:
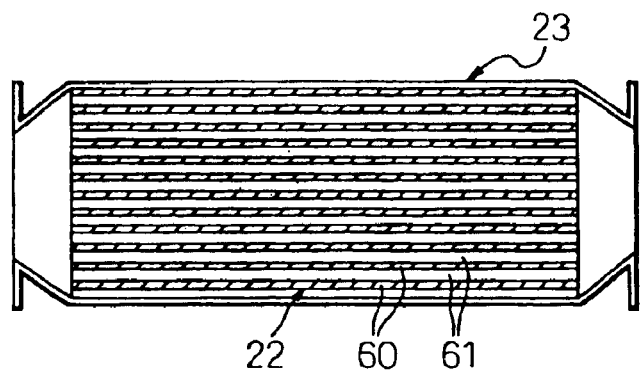
FIGS. 18A, 18B, 18C, 18D, and 18E and FIGS. 19A and 19B are views of various examples of catalysts.
Figure 18B:
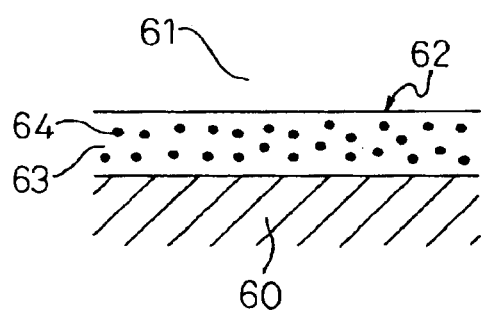

As shown in FIG. 18A, the catalyst 22 has a honeycomb structure and is provided with a large number of exhaust gas passages 61 surrounded by the honeycomb structure substrate 60. A catalyst layer is formed on the surface of the substrate 60 forming the exhaust gas passages 61. In the example shown in FIG. 18B, the catalyst layer 62 is comprised of titania 63. Vanadium 64 is carried on this titania 63. When the aqueous urea solution is fed, the urea, that is, the ammonia generating compound, contained in the aqueous urea solution is stored in the carrier titania 63. It is not necessarily clear how the ammonia generating compound is stored in the titania 63, but probably it is held in the catalyst 22 by adsorption.

In the present invention, the ammonia released a little at a time from the urea, that is, the ammonia generating compound, stored in the catalytic converter 22 is used to reduce the $NO_x$ in the exhaust gas, so it can be said to be preferable to hold as large an amount of urea, that is, the ammonia generating compound as possible, in the catalyst 22 when the aqueous urea solution is fed and to cause the ammonia to be released a little at a time from the ammonia generating compound. FIGS. 18C, 18D, and 18E and FIGS. 19A and 19B show examples where as large an amount of ammonia generating compound as possible is held in the catalyst 22.

Figure 18C:
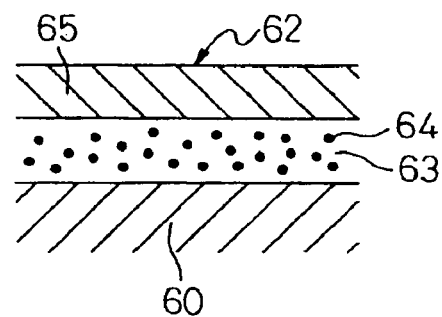

That is, in the example shown in FIG. 18C, a zeolite layer 65 is formed on a carrier comprised of titania 63. By doing this, the urea, that is, the ammonia generating compound, is held in the zeolite layer 65 as well, so the amount of the ammonia generating compound held is increased. The ammonia generating compound held in the zeolite layer 65 disperses into the carrier comprised of the titania 63, then is decomposed by heat, so ammonia is slowly released.

Figure 18D:
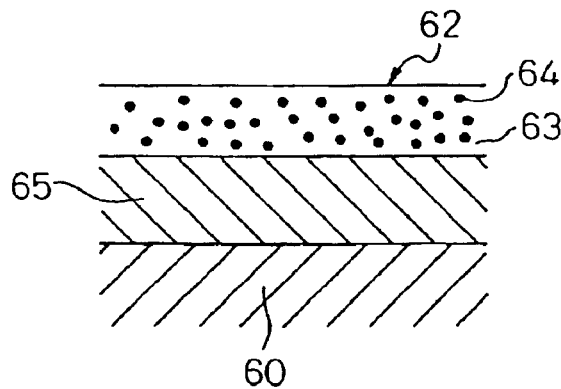

In the example shown in FIG. 18D, a zeolite layer 65 is formed between a substrate 60 and a carrier comprised of titania 63. In this case as well, the urea, that is, the ammonia generating compound, is held in the zeolite layer 65 as well, so the amount of the ammonia generating compound held is increased. The ammonia generating compound held in the zeolite layer 65 disperses into the carrier comprised of the titania 64, then is decomposed by heat, so ammonia is slowly released.

Figure 18E:
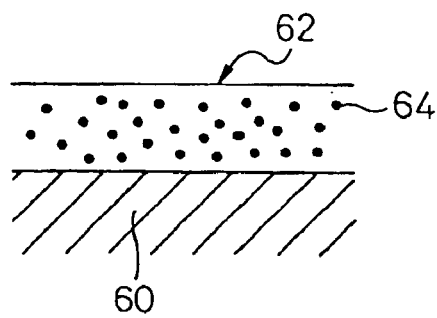

In the example shown in FIG. 18E, the catalyst layer 62 is comprised of titania and zeolite. Vanadium is carried on this carrier comprised of titania and zeolite.

Figure 19A:
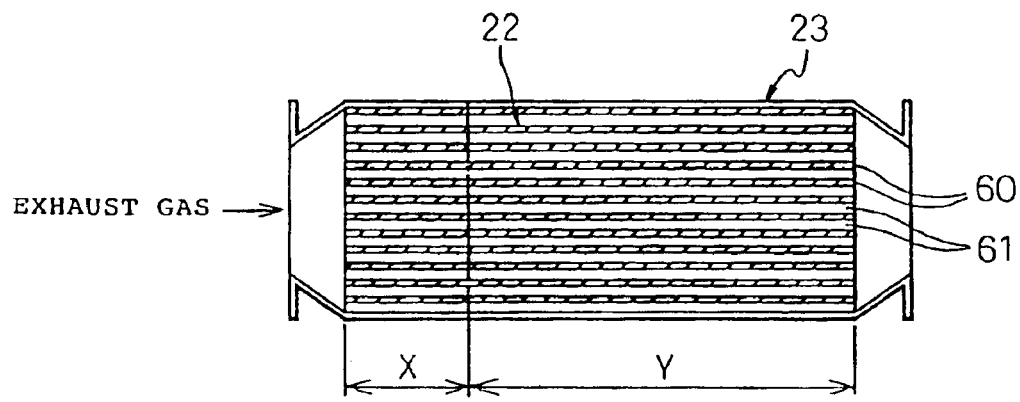
Figure 19B:
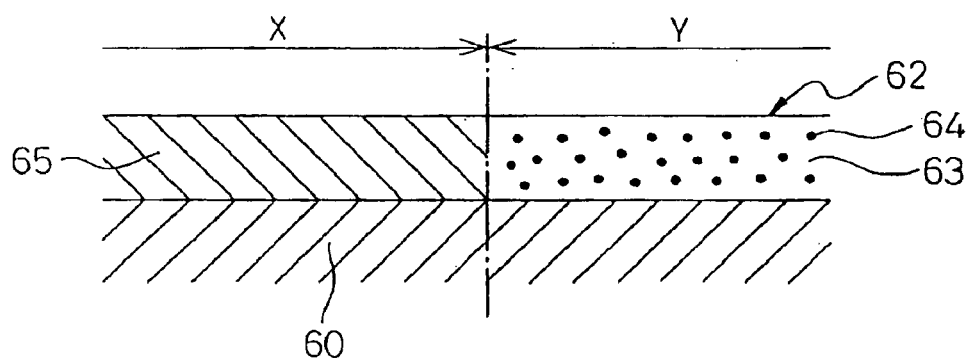
Figure 20:
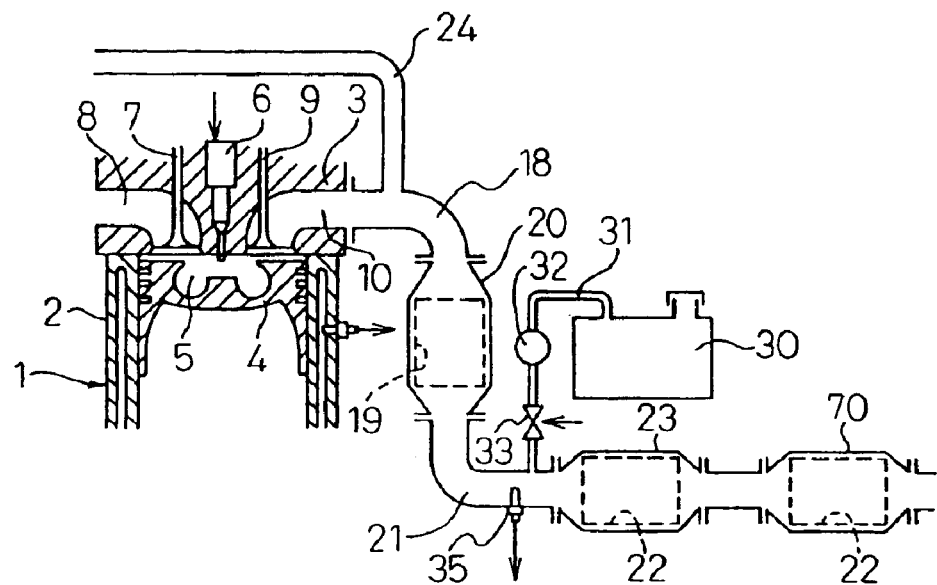
FIG. 20 to FIG. 23 are overviews of internal combustion engines showing various embodiments.

In the example shown in FIGS. 19A and 19B, in the region X at the upstream side of the catalyst 22, the catalyst layer 62 is comprised of zeolite, while in the region Y at the downstream side of the catalyst 22, the catalyst layer 62 is comprised of titania 63 carrying vanadium 64. In this example as well, the urea, that is, the ammonia generating compound, is held in the zeolite layer 65 as well, so the amount of the ammonia generating compound held is increased. The ammonia generating compound held in the zeolite layer 65 disperses into the carrier comprised of the titania 63, then is decomposed by heat, so ammonia is slowly released.

FIG. 20 to FIG. 23 show other embodiments of an internal combustion engine. In the example shown in FIG. 20, a further catalytic converter 70 is arranged downstream from the catalytic converter 23. As the catalyst 22 housed in the catalytic converter 70, it is possible to use either of a copper zeolite catalyst or a vanadium titania catalyst in the same way as the catalyst 22 housed in the catalytic converter 23. However, when using both of these catalysts 22, it is preferable to make the upstream side catalyst 22 in the catalytic converter 23 a vanadium titania catalyst and make the downstream side catalyst 22 in the catalytic converter 70 a copper zeolite catalyst. This is because the ammonia flowing out from the vanadium titania catalyst can be removed on the copper zeolite catalyst.

Figure 21:
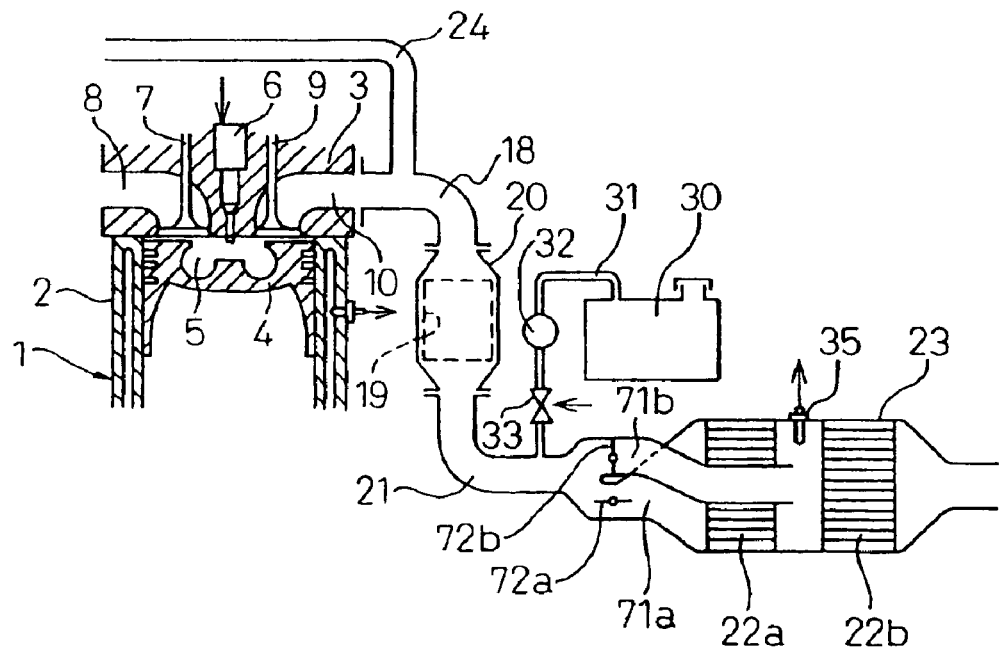

In the embodiment shown in FIG. 21, a pair of catalysts 22a and 22b are arranged at a distance from each other in the catalytic converter 23. Further, in this embodiment, the exhaust pipe 21 is branched into a first exhaust passage 71a opening to the catalytic converter 23 and a second exhaust passage 71b connected to a space between the catalysts 22a and 22b. A first exhaust control valve 72a and a second exhaust control valve 72b are arranged in the exhaust passages 71a and 71b, respectively. Further, in this embodiment, the aqueous urea solution is fed into the exhaust pipe 21 upstream of the two exhaust control valves 72a and 72b.

In this embodiment, when the temperature of the exhaust gas detected by the temperature sensor 35 is lower than about 150° C., as shown in FIG. 21, the first exhaust control valve 72a is made to fully open and the second exhaust control valve 72b is made to fully close. At this time, the exhaust gas first passes through the upstream side catalyst 22a, then passes through the downstream side catalyst 22b. At this time, the temperature of the catalysts 22a and 22b is in the ammonia generating compound storage region, therefore the majority of the urea in the aqueous urea solution fed is stored in the upstream side catalyst 22a.

On the other hand, while the temperature of the exhaust gas detected by the temperature sensor 35 is between about 150° C. and 250° C., the first exhaust control valve 72a is made to fully close and the second exhaust control valve 72b is made to fully open. Therefore, at this time, the exhaust gas passes through the second exhaust passage 71b and then passes through the downstream side catalyst 22b. At this time, the urea stored in the upstream side catalyst 22a is held as it is, and the $NO_x$ of the exhaust gas is purified at the downstream side catalyst 22b by the aqueous urea solution fed.

On the other hand, when the temperature of the exhaust gas detected by the temperature sensor 35 becomes more than about 250° C., the first exhaust control valve 72a is made to fully open again and the second exhaust control valve 72b is made to fully close again. When the engine is being accelerated, the exhaust gas detected by the temperature sensor 35 becomes more than 250° C., so when the engine is being accelerated, the exhaust gas flows into the upstream side catalyst 22a. At this time, ammonia is released a little at a time from the large amount of ammonia generating compound stored in the upstream side catalyst 22a, and the $NO_x$ in the exhaust gas is reduced in the upstream side catalyst 22a and the downstream side catalyst 22b by this ammonia.

Figure 22:
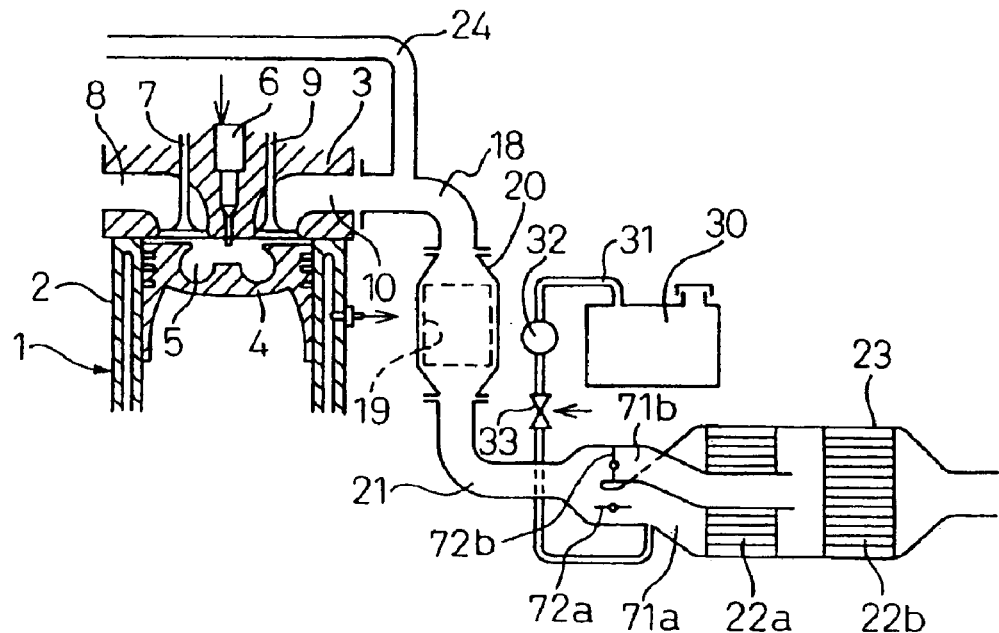

In the embodiment shown in FIG. 22, unlike the embodiment shown in FIG. 21, an aqueous urea solution is fed in the first exhaust passage 71a downstream of the first exhaust control valve 72a.

In this embodiment, when the required load of the engine is lower than a predetermined set load, the first exhaust control valve 72a is made to fully close and the second exhaust control valve 72b is made to fully open. Therefore, the exhaust gas passes through the second exhaust passage 71b and then passes through the downstream side catalyst 22b. Further, at this time, the exhaust gas does not flow through the first exhaust passage 71a and the temperature of the upstream side catalyst 22b is in the ammonia generating compound storage region. Therefore, at this time, the majority of the urea in the aqueous urea solution fed is stored in the upstream side catalyst 22a.

On the other hand, when the required load of the engine becomes higher than the set load, as shown in FIG. 22, the first exhaust control valve 72a is made to fully open and the second exhaust control valve 72b is made to fully close. At this time, the exhaust gas first passes through the upstream side catalyst 22a, then passes through the downstream side catalyst 22b. Therefore, ammonia is released at little at a time from the large amount of the ammonia generating compound stored in the upstream catalyst 22a, and the $NO_x$ in the exhaust gas is reduced in the upstream side catalyst 22a and the downstream side catalyst 22b by this ammonia.

Figure 23:
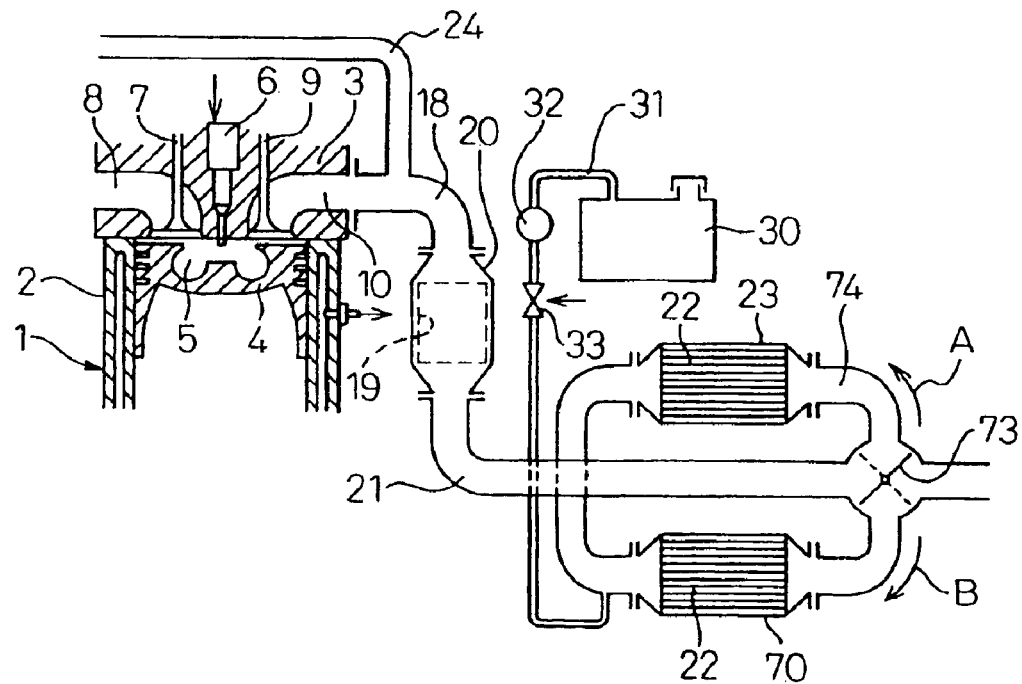

In the embodiment shown in FIG. 23, a ring-shaped exhaust passage 74 intersecting with the exhaust pipe 21 at a flow path switching valve 73, arranged in the exhaust pipe 21, is provided. A first catalytic converter 23 and a second catalytic converter 70 are arranged in series in the ring-shaped exhaust passage 74.

In this embodiment, when the required load of the engine is lower than a predetermined set load, the flow path control valve 73 is switched to a position shown by the solid line in FIG. 23 so that the exhaust gas which had been sent through the exhaust pipe 21 flows in the direction of the arrow A, that is, first passes through the catalyst 22 in the first catalytic converter 23, then passes through the catalyst 22 in the second catalytic converter 70. At this time, the aqueous urea solution is fed to the upstream side of the second catalytic converter 70. At this time, the temperature of the catalyst 22 in the second catalytic converter 70 is lower than the temperature of the catalyst 22 in the first catalytic converter 23 and therefore the urea, that is, the ammonia generating compound, in the aqueous urea solution fed is stored well in the catalyst 22 in the second catalytic converter 70.

On the other hand, when the required load of the engine becomes higher than the set load, the flow path control valve 73 is switched to the position shown by the broken line in FIG. 23 so that the exhaust gas which had been sent through the exhaust pipe 21 flows in the direction of the arrow B, that is, first passes through the catalyst 22 in the second catalytic converter 70, then passes through the catalyst 22 in the first catalytic converter 23. At this time, the temperature of the catalyst 22 in the second catalytic converter 70 becomes higher than the temperature of the catalyst 22 in the first catalytic converter 23 and therefore ammonia is released well from the ammonia generating compound stored in the catalyst 22 in the second catalytic converter 70.

Up to there, the present invention had been explained taking as an example the case of use of an aqueous urea solution as the liquid containing an ammonia generating compound. In this case, as mentioned above, it is also possible to use something other than urea as the ammonia generating compound and possible to use something other than water as the solvent. Further, it is also possible to feed ammonia water or a gas containing ammonia together with the liquid containing an ammonia generating compound into the exhaust passage. In this case, the gas containing ammonia may be generated using solid urea.

LIST OF REFERENCE NUMERALS

1 . . . engine body
5 . . . combustion chamber
6 . . . fuel injector
8 . . . intake port
10 . . . exhaust port
18 . . . exhaust manifold
20, 23 . . . catalytic converters
19, 22 . . . catalysts
33 . . . flow control valve

What is claimed is:

1. An exhaust gas purification device of an internal combustion engine arranging a catalyst suitable for reduction of NOx in exhaust gas by ammonia in the presence of excess oxygen in an engine exhaust passage, said device comprising:

feeding means for feeding a liquid containing an ammonia generating compound to the catalyst;

feed control means for controlling the amount of feed of the liquid, the catalyst storing inside it at least part of the ammonia generating compound contained in the liquid fed to the catalyst and having the function of causing the release of ammonia a little at a time from the ammonia generating compound stored in the catalyst along with the rise of temperature of the catalyst and reducing the NOx in the exhaust gas by the ammonia released, decision means for deciding if the temperature of the catalyst is in an ammonia generating compound storage region which stores the ammonia generating compound contained in the liquid fed to the catalyst inside the catalyst and releases almost no ammonia from the stored generating compound, or if the temperature of the catalyst is in an ammonia release region which causes the ammonia to be released a little at a time from the stored ammonia generating compound, the feed control means feeding a sufficient amount of the liquid required to the catalyst in the form of pulses at time intervals when the temperature of the catalyst is in the ammonia generating compound storage region, said sufficient amount of the liquid being necessary to store in the catalyst in advance enough of the ammonia generating compound for releasing the amount of ammonia required when the temperature of the catalyst becomes the ammonia release region, the feed control means feeding the liquid continuously into the catalyst when the temperature of the catalyst is in a state where ammonia is released all at once from the catalyst.

2. An exhaust gas purification device of an internal combustion engine as set forth in claim 1, wherein the decision means decides that the temperature of the catalyst is in the ammonia generating compound storage region at the time of engine startup.

3. An exhaust gas purification device of an internal combustion engine as set forth in claim 1, wherein the decision means decides that the temperature of the catalyst is in the ammonia generating compound storage region when a required load of the engine is lower than a predetermined load.

4. An exhaust gas purification device of an internal combustion engine as set forth in claim 1, wherein the decision means decides that the temperature of the catalyst is in the ammonia generating compound storage region at the time of engine deceleration.

5. An exhaust gas purification device of an internal combustion engine as set forth in claim 1, an exhaust gas recirculation device is provided for recirculating the exhaust gas in an intake passage and stopping a recirculation action of the exhaust gas when it is decided by the decision means that the temperature of the catalyst is in the ammonia generating compound storage region.

6. An exhaust gas purification device of an internal combustion engine as set forth in claim 1, wherein the decision means decides that the temperature of the catalyst is in the ammonia release region at the time of acceleration of the engine.

7. An exhaust gas purification device of an internal combustion engine as set forth in claim 1, estimating means is provided for estimating the amount of the ammonia generating compound stored in the catalyst and said feed control means stops the feed of the liquid when the estimated amount of storage of the ammonia generating compound exceeds a predetermined maximum amount of storage.

8. An exhaust gas purification device of an internal combustion engine as set forth in claim 1, estimating means is provided for estimating the amount of the ammonia generating compound stored in said catalyst and estimating the amount of the ammonia released from the ammonia generating compound stored in the catalyst and said feed control means feeds the amount of the liquid necessary for reducing the NOx in the exhaust gas which cannot be reduced by the ammonia released from the ammonia generating compound.

9. An exhaust gas purification device of an internal combustion engine as set forth in claim 1, wherein said catalyst immediately produces ammonia from said liquid just when said liquid is fed to the catalyst when the temperature of the catalyst is higher than a predetermined temperature and said feed control means controls the amount of feed of the liquid so that the amount of the ammonia generating compound in the liquid becomes the equivalent ratio required for reducing the NOx in the exhaust gas when the temperature of the catalyst is higher than the predetermined temperature.

10. An exhaust gas purification device of an internal combustion engine as set forth in claim 1, wherein the liquid containing the ammonia generating compound is an aqueous urea solution.

11. An exhaust gas purification device of an internal combustion engine as set forth in claim 1, wherein the catalyst is comprised of a copper zeolite catalyst.

12. An exhaust gas purification device of an internal combustion engine as set forth in claim 1, wherein said catalyst is arranged in the engine exhaust passage and the liquid is fed into the engine exhaust passage upstream of said catalyst.

13. An exhaust gas purification device of an internal combustion engine as set forth in claim 1, wherein said catalyst is arranged in the engine exhaust passage and another catalyst having an oxidation function is arranged in the engine exhaust passage upstream of said catalyst.

14. An exhaust gas purification device of an internal combustion engine as set forth in claim 1, wherein the catalyst is comprised of a pair of catalysts arranged at an interval from each other in the engine exhaust passage.

15. An exhaust gas purification device of an internal combustion engine as set forth in claim 1, in which, when the temperature of one of a pair of the catalysts is in the ammonia generating compound storage region, the liquid is fed to said one of the catalysts to cause the ammonia generating compound contained in the liquid to be stored in said one of the catalysts, and the NOx in the exhaust gas is reduced in both catalysts by the ammonia released from the ammonia generating compound stored in said one of the catalysts when the temperature of said one of the catalysts becomes the ammonia release region.

16. An exhaust gas purification device of an internal combustion engine as set forth in claim 1, wherein said decision means decides that the temperature of the catalyst is in the ammonia generating compound storage region when a temperature representative of the temperature of the catalyst is lower than a predetermined temperature and that the temperature of the catalyst is in the ammonia release region when the temperature representative of the temperature of the catalyst is higher than the predetermined temperature.

17. An exhaust gas purification device of an internal combustion engine as set forth in claim 2, wherein the temperature representative of the temperature of the catalyst is the temperature of the exhaust gas flowing into the catalyst.

18. An exhaust gas purification device of an internal combustion engine as set forth in claim 1, wherein said feed control means continuously feeds the liquid.

19. An exhaust gas purification device of an internal combustion engine as set forth in claim 18, wherein the amount of the ammonia generating compound contained in the fed liquid is more than the equivalent ratio required for reducing the NOx in the exhaust gas.

20. An exhaust gas purification device of an internal combustion engine as set forth in claim 1, wherein said catalyst is comprised of a vanadium titania catalyst.

21. An exhaust gas purification device of an internal combustion engine as set forth in claim 17, a zeolite catalyst layer is provided in addition to the vanadium titania catalyst layer.

* * * * *